United States Patent [19]

Shpigel

[11] Patent Number: 5,101,681

[45] Date of Patent: Apr. 7, 1992

[54] INTERLOCKING-BODY CONNECTIVE JOINTS

[75] Inventor: Vladimir Shpigel, Brooklyn, N.Y.

[73] Assignee: Ameus Corporation, New York, N.Y.

[21] Appl. No.: 492,622

[22] Filed: Mar. 13, 1990

Related U.S. Application Data

[60] Continuation-in-part of Ser. No. 373,997, Jun. 29, 1989, Pat. No. 4,976,468, which is a division of Ser. No. 59,966, Jun. 9, 1987, Pat. No. 4,845,603.

[51] Int. Cl.[5] .................. G05G 11/00; F16D 3/00; B25J 17/00
[52] U.S. Cl. .................................. 74/479; 403/57; 403/58; 901/23; 901/28
[58] Field of Search .............. 74/479; 174/69; 403/24, 403/57, 58, 410; 901/23, 24, 28, 29

[56] References Cited

U.S. PATENT DOCUMENTS

| | | | |
|---|---|---|---|
| 1,607,807 | 11/1926 | Anderson | 174/69 X |
| 2,259,999 | 10/1941 | Bryant et al. | 173/324 |
| 4,296,681 | 10/1981 | Rosheim | 901/28 X |
| 4,723,460 | 2/1988 | Rosheim | 901/28 X |
| 4,729,253 | 3/1988 | Rosheim | 901/29 X |

FOREIGN PATENT DOCUMENTS

| | | | |
|---|---|---|---|
| 2323915 | 4/1977 | France. | |
| 2376331 | 7/1978 | France. | |
| 717166 | 8/1971 | Italy | 403/57 |
| 246983 | 11/1969 | U.S.S.R. | 403/57 |
| 641116 | 1/1979 | U.S.S.R. | 403/57 |
| 1503110 | 3/1978 | United Kingdom. | |

Primary Examiner—Allan D. Herrmann
Assistant Examiner—David W. Laub
Attorney, Agent, or Firm—Ashen Martin Seldon Lippman & Scillieri

[57] ABSTRACT

These joints are particularly useful for transmitting a flux (electrical, optical, liquid or gaseous) either entirely across the joint, or from one side of the joint to devices mounted on the joint itself that use such a flux. Such devices can, for example, be motors to drive the joint itself. The interlocking bodies are typically but not necessarily circular rings, mounted to a common internal structure that permits each body to rotate about its own axis. The resulting joints can rotate in all directions with a very high angular range—in most cases limited only by the angle subtended by connecting stems used to mount the joint to a base or to mount objects to the joint for motion. Some of these joints have hollow central enclosures for passing flexible wires or tubing to carry the flux, so that the flux can be transmitted across or into the joint with the same high degree of freedom, and yet without slip rings, brushes, or other expensive motionaccommodating components subject to wear. The common internal structure is extremely simple, inexpensive and easily made—providing two interfitted tracks. These can take the form of four identical interfitted discs; or two identical circular-segment corner pairs, each with offset centers; or ultimately any of a great variety of arbitrary shapes that provide necessary guide surfaces for arcuate motion of the bodies.

54 Claims, 18 Drawing Sheets

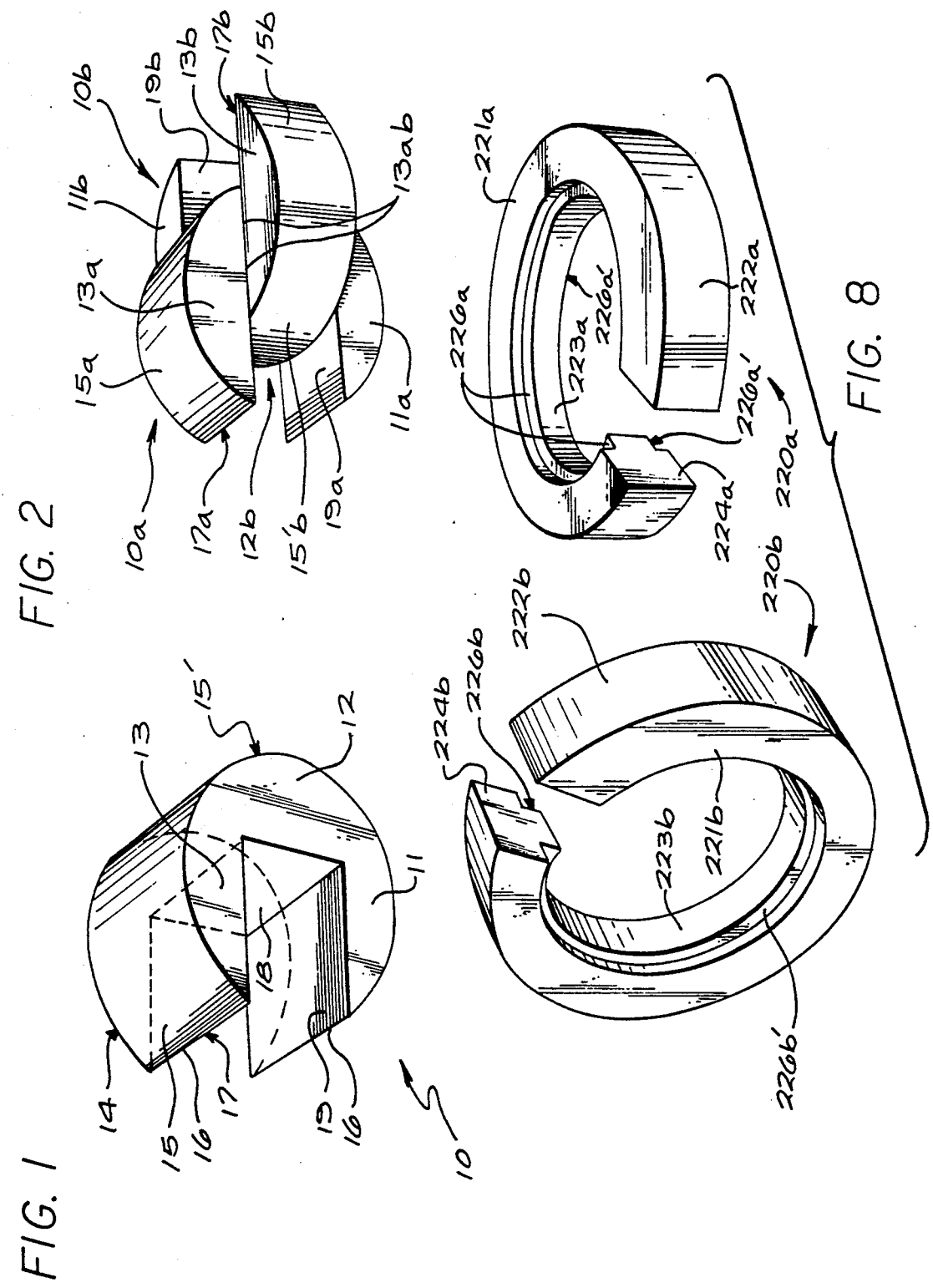

FIG. 6
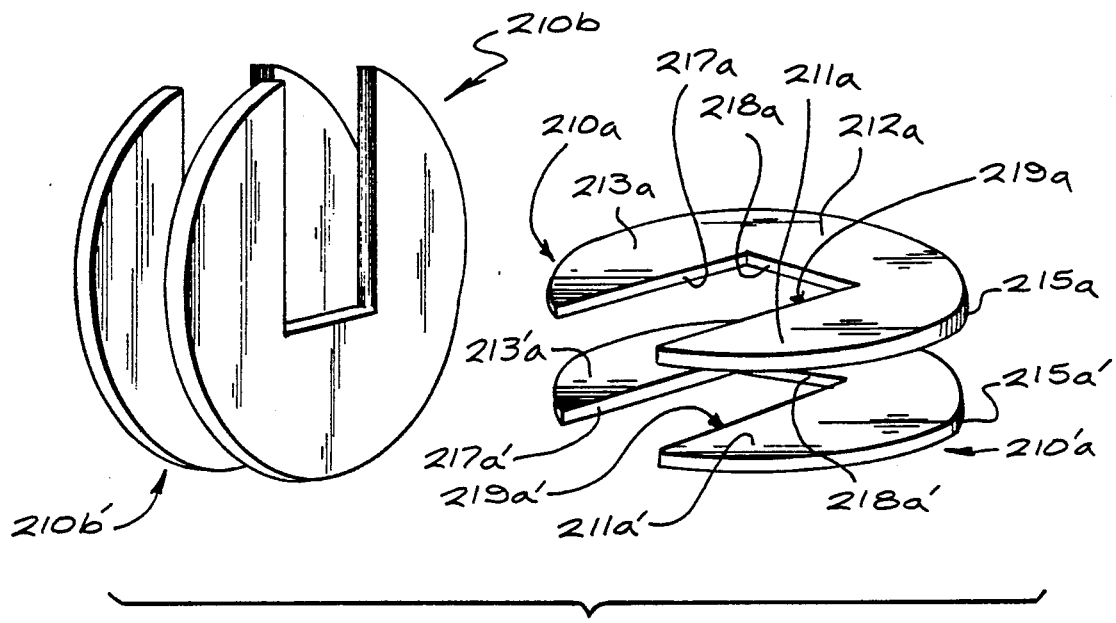
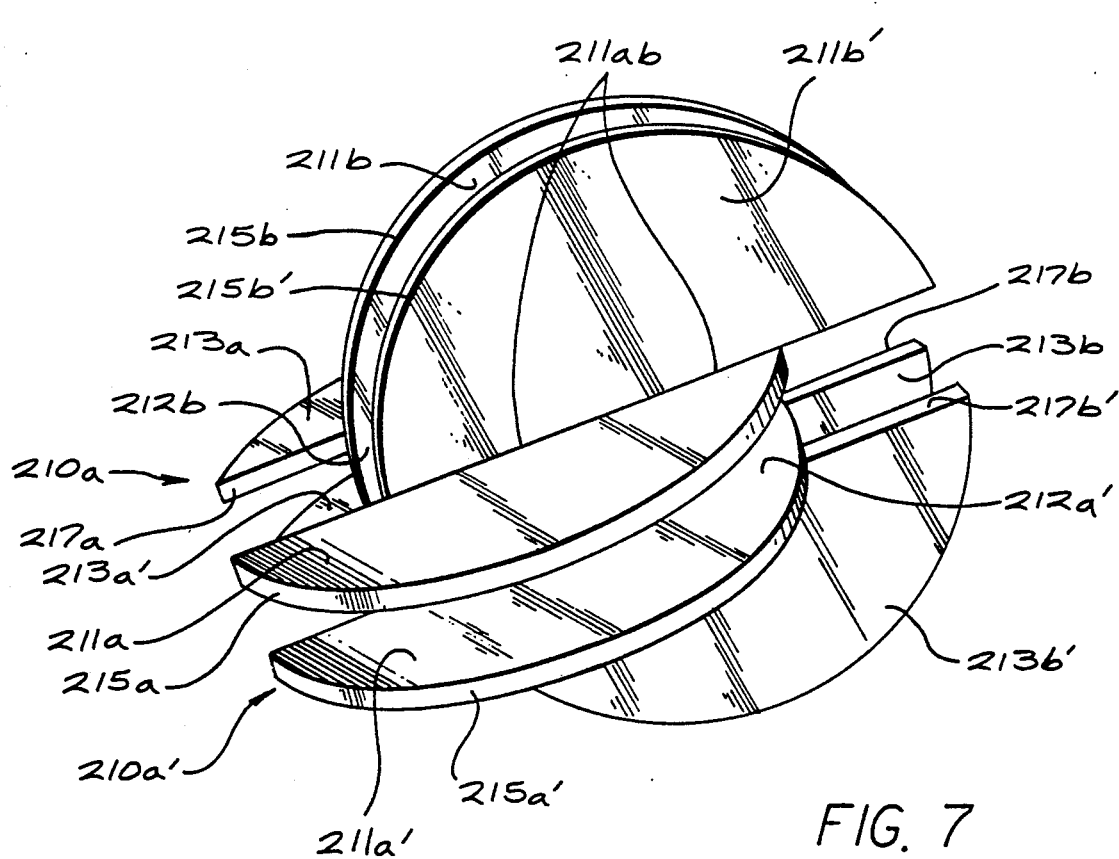
FIG. 7

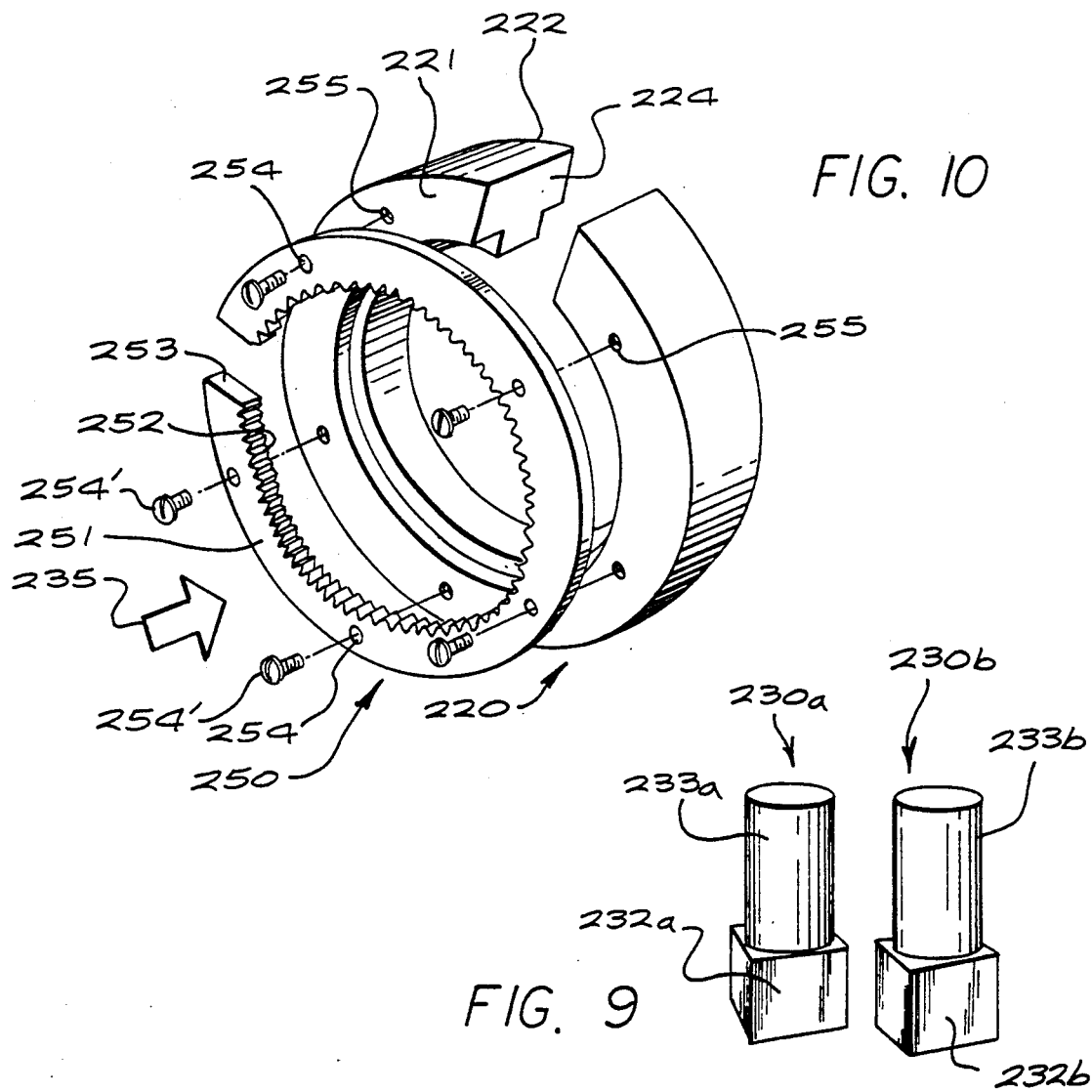
FIG. 10
FIG. 9
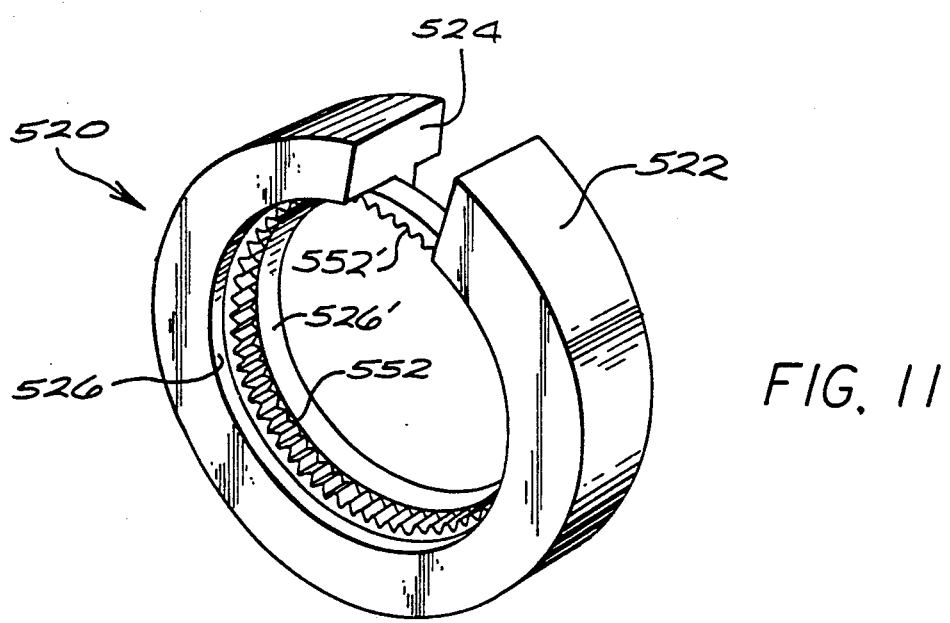
FIG. 11

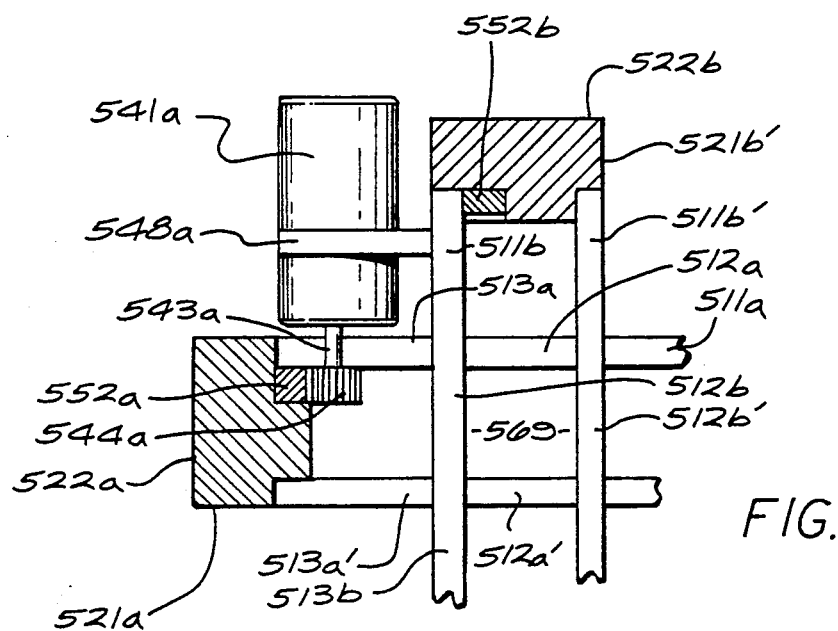
FIG. 12a
FIG. 13
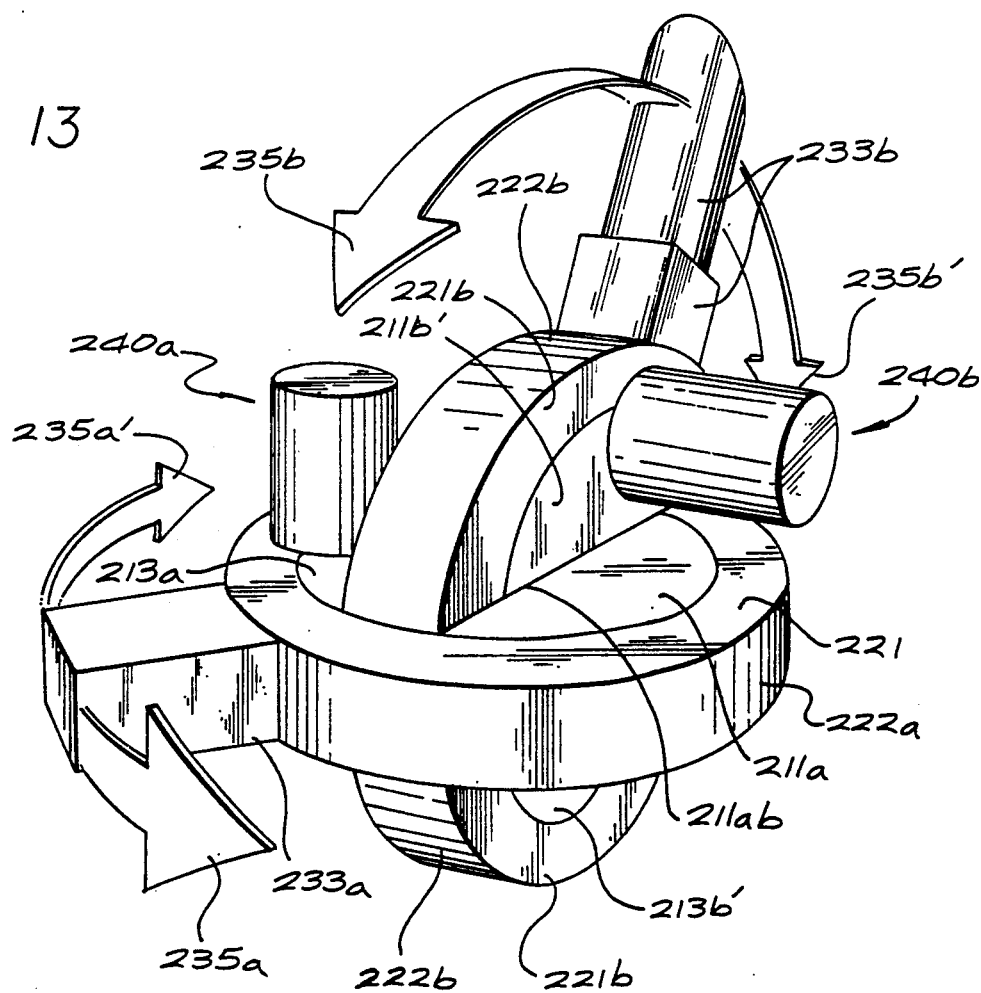

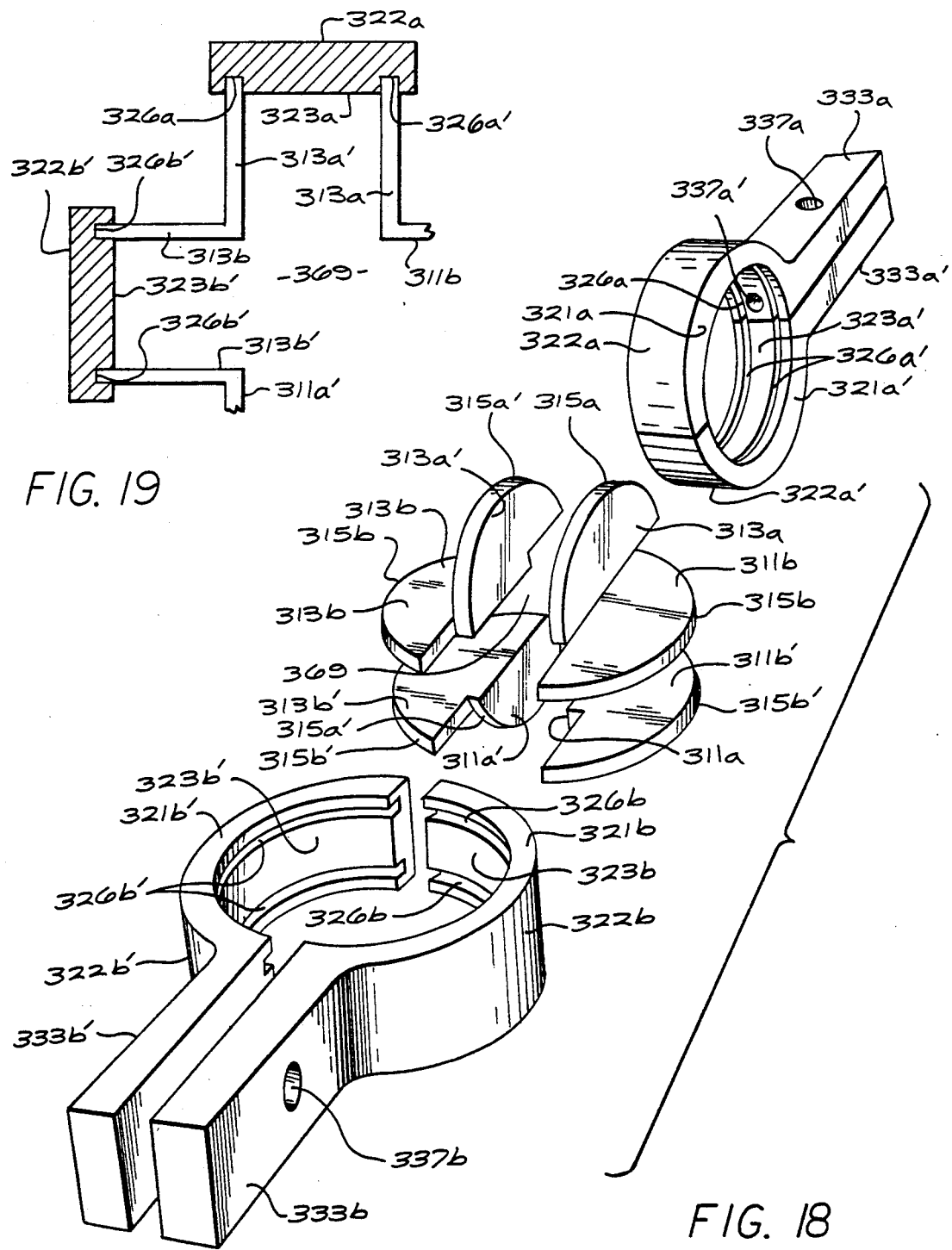
FIG. 19
FIG. 18
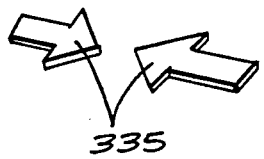
335

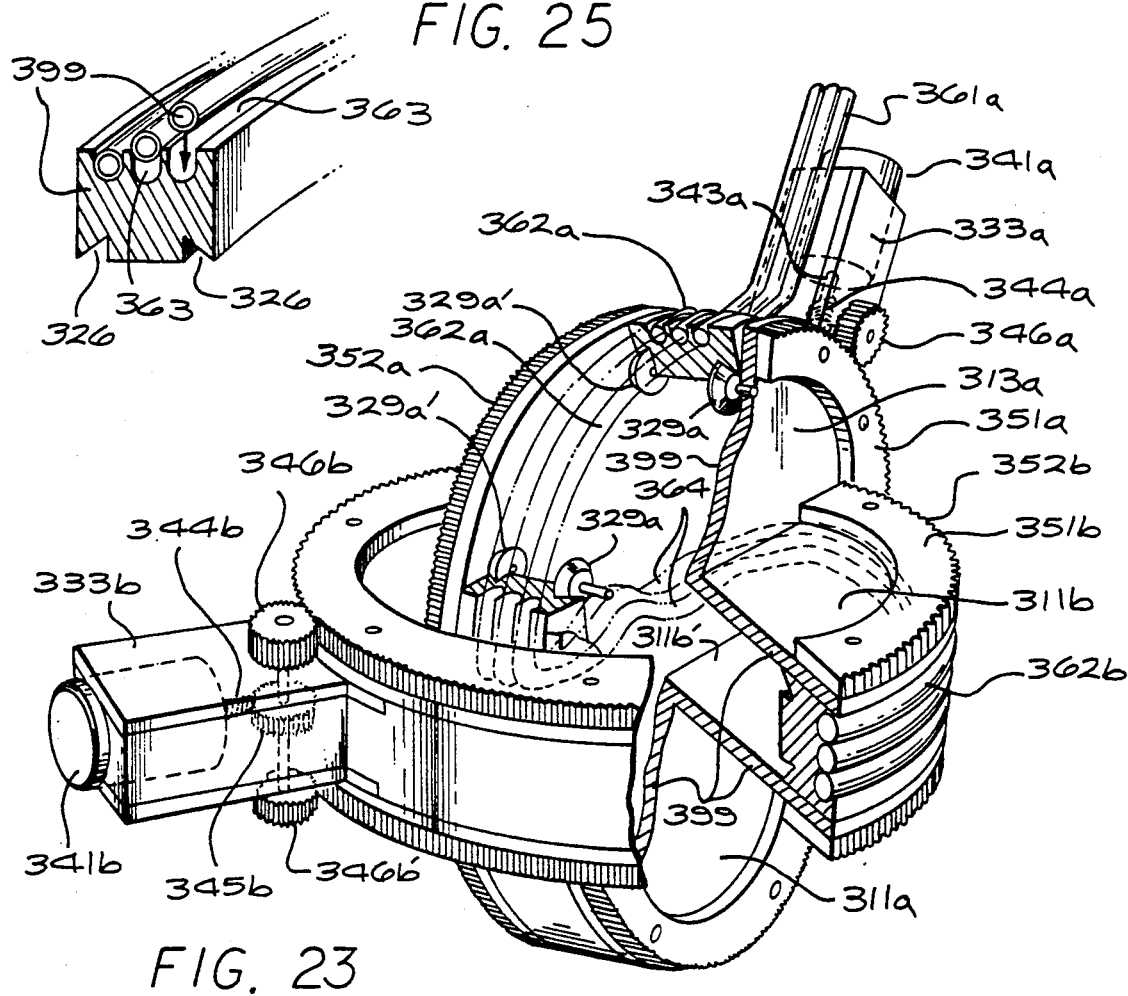

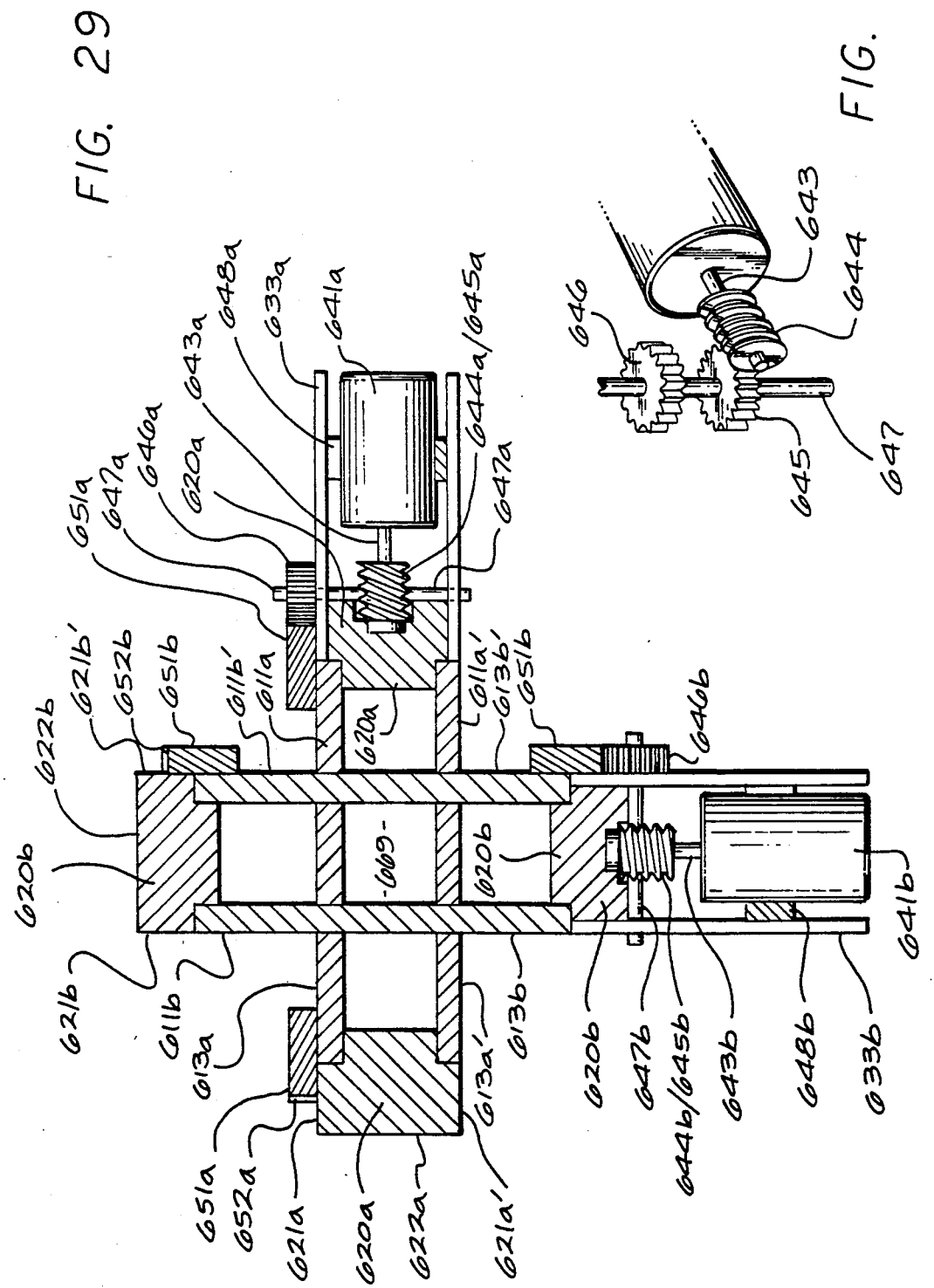

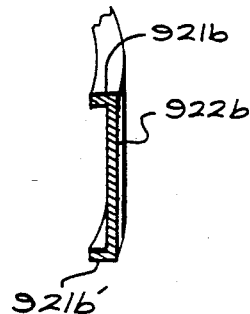
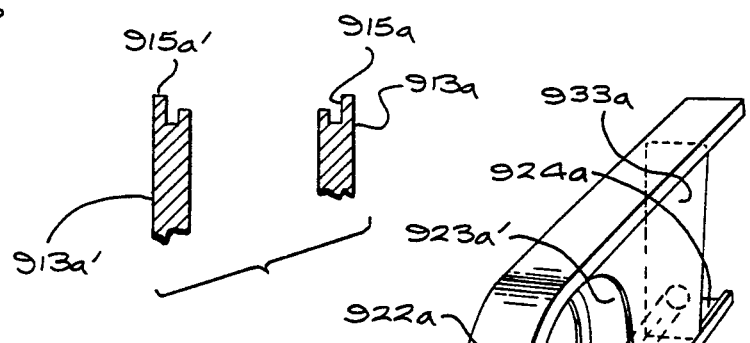
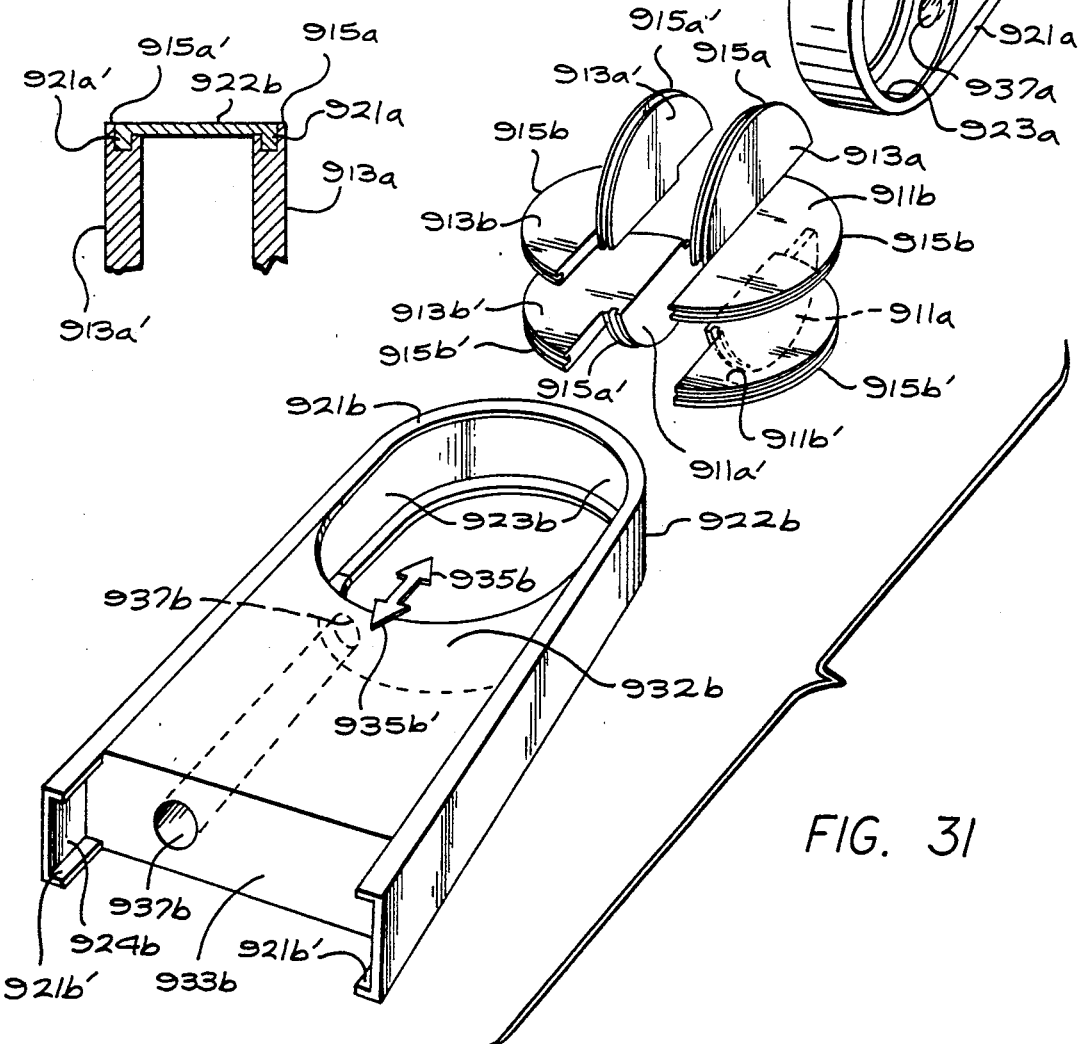

INTERLOCKING-BODY CONNECTIVE JOINTS

BACKGROUND

1. RELATED APPLICATIONS

This is a continuation-in-part of my copending application Ser. No. 373,997, filed on June 29, 1989, which has now issued as U.S. Pat. No. 4,976,468; and which is in turn a divisional of my application Ser. No. 059,966, filed on June 9, 1987, and issued on July 4, 1989, as U.S. Pat. No. 4,845,603; both of which are incorporated by reference.

2. FIELD OF THE INVENTION

This invention relates generally to connective mechanical joints; and more particularly to a joint that permits relative rotation of interconnected articles—through large angles, and about an axis having virtually any arbitrarily selectable orientation. The joint can be made to transmit a force or a flux (electrical, optical or fluid) between the articles.

3. PRIOR ART

Known connective joints may be considered in three very broad categories: the hinge, which provides large-amplitude rotation between two hinged elements, but only about a single axis; the ball-and-socket joint, which provides rotation about arbitrarily selectable axes, but usually with limited range of rotation; and the universal joint, which is in effect range of rotation; and the universal joint, which is in effect a two-stage hinge.

Both large-amplitude rotation and a wide range of rotational axes are achieved with a universal joint by combining two hinges in series, generally at right angles. The selection of rotational axes is essentially arbitrary if rotation is permitted about one or both points of attachment of articles to the universal joint—for example, if the articles interconnected by the joint are rotatable shafts.

With a ball joint, rotational range is particularly limited when a fluid flux is to be transmitted across the joint—as, for example, in a liquid-transmitting joint such as a shower head.

In two different senses, torque can be transmitted through a hinge or universal joint. First, an article attached to one side of the joint can be rotated by rotating an article attached to the other side of the joint—provided that the rotation is about an axis on which the hinge or universal joint is not free.

(The availability of such an axis for useful purposes depends upon the relative orientation of the two sides of the joint. For example, suppose that the two articles are drive shafts, but the joint is initially operated or set so that these shafts are mutually at right angles. Now rotation of either of the two shafts about its own axis can be transmitted through the joint to the other, but of course the resulting rotation of the receiving shaft is not about its own axis.)

Force or torque can also be transmitted through a hinge or universal joint in a second sense. For such transmission, a gear or a traction surface is provided on an article at one side of the joint, and a suitably mating drive gear or traction wheel is provided on an article at the other side of the joint. With this arrangement, forcible rotation of the gear or wheel results in operation of the joint itself—i.e., change of the relative angle (or angles) at which the two articles are joined.

In the prior art, it has not been readily feasible to interconnect articles for rotation through large angles about a virtually arbitrary axis, using a single-stage joint. Such connection has been particularly awkward with transmission of force or a flux across the joint.

In its simplest forms, the invention disclosed in my two above-listed previous applications may be very roughly conceptualized as a particularly efficient single-stage hinge, in which there is no separate hinge pin as such. Instead, each side or element of the hinge can itself serve as the hinge pin, entering or leaving this role at the pleasure of the user.

Even though this "hinge" has only one stage, its two sides or elements pivot about different axes, thereby permitting operation of the hinge about virtually any axis the user selects. Consequently this single-stage hinge is free to rotate in as many different directions, roughly speaking, as a universal joint. Furthermore, being a hinge rather than a ball joint, it operates through a very wide angular range.

Alternatively, and curiously, that earlier invention can be very roughly conceptualized as a hinge in which everything except the hinge pin has been eliminated—but there are two hinge pins, each rolled or wrapped around the other in an endless ring, to permit operation of the hinge in virtually any direction.

These informal conceptualizations of the invention of my previous applications may seem contradictory and slightly baffling, but as made clear in those applications both conceptualizations are reasonably accurate. That invention is based upon the concept of interlocking bodies—with, in most embodiments, each body rotating upon its own axis, and each rotating through and around the other body. For some purposes, as described in my previous applications, a common internal structure can be provided for transmission of a force or a flux through all or part of the joint.

In some preferred embodiments emphasized in my previous applications, each body is a toroid in the relatively strict sense of having a circular minor cross-section. It is this property that allows each body to serve as a "hinge pin" for the other body—particularly if, as in some preferred embodiments, each body fits closely around the circular minor cross-section of the other body. These properties also serve to conceal the common internal structure, if desired, so that the capability of the joint for transmission of force or flux appears unaccountable to a casual observer.

One result, however, is that the bodies fit together relatively tightly, leaving relatively little open space for flux-transmitting interconnections within the common internal structure of the joint, and therefore militating in favor of very compact slip-rings, brushes, or sliding tubing connections for transmission of force or flux through the joint. These types of transmission components are subject to wear, and also are relatively expensive to make and assemble.

My previous invention, accordingly, does leave some room for refinement in the practical areas of economy and durability—particularly for those uses in which concealment of the existence of a common internal structure is not particularly desired.

Another joint that is related to my invention has been described by Mark E. Rosheim, in *Robot Wrist Actuators* (Wiley Interscience Publications, 1989) at pages 213 through 218. Rosheim's device incorporates two interlocking rings, each rotatable about its own axis, and about and through the other ring—being guided in such rotation by a semicircular arcuate guiding structure.

Each of the two rings is driven by a hydraulic piston and cylinder, which are respectively integral with the ring and its guide surface. More specifically, each ring itself defines a circular piston rod, mounted along which is a laterally (that is, radially) extending vane or paddle that serves as a piston. In general this piston seemingly could be of arbitrary cross-section, but Rosheim illustrates a rectangular piston.

The circular piston rod passes through seals at both ends of a semicircular hydraulic chamber that serves as the cylinder. The piston slides within this chamber, making a sliding seal with the chamber walls.

Hydraulic fluid introduced controllably and selectably into either end of the chamber, to drive the piston along the chamber, and thereby rotate the circular piston rod (i.e., one of the two interlocking rings), in either direction respectively. The Rosheim system is intrinsically limited in maximum rotational range by impingement of the piston upon the two internal end walls of the semicircular chamber. In principle, although Rosheim does not say so, this limitation considered alone could be obviated by extending the chamber from semicircular to nearly circular.

In normal or typical use, however, as Rosheim shows, some stem or other mounting element must protrude from the piston-rod/ring, outside the chamber, for attachment of a tool or working head to be positioned by the joint. In such practical cases, the Rosheim system is also limited in maximum rotational range by impingement of this stem upon the two external end walls of the chamber.

If the first limitation considered above were obviated by increasing the angular extent of the chamber beyond semicircular, the result would be to make this second limitation even more stringent. That is, the sum of the angular ranges of the two objects rotating with the piston rod (the piston inside the chamber, and the stem outside) can only be slightly less than a full circle; so the maximum range of each can only be slightly less than a semicircle.

Rosheim does not articulate these limitations; even if he were to recognize them, however, at least no minor modification of his hydraulic system could circumvent them. In particular, because Rosheim's piston-and-chamber combination itself integrally supplies the guiding surfaces for arcuate motion of the ring, the piston rotational range cannot readily be increased by merely removing the piston or chamber from his finished device and driving the ring rotation in some other way.

In addition, the Rosheim device—while very simple and elegant in principle—is clearly an expensive and difficult article to manufacture. It depends for its effectiveness upon two sliding seals at the ends of the chamber and a piston seal that slides along the chamber interior walls.

The semicircular chamber walls and the entire ring (the circular piston rod) must be made and maintained smooth enough for trouble-free operation of these sliding seals. This is a rather severe condition for most practical devices: nearly the entire length of the ring (only excepting the segments subtended by the end seals) is outside the chamber at one time or another, exposed to the possibility of scrapes or dents that could interfere with sealing motion.

Furthermore, Rosheim's main illustrations (FIGS. 6.10 through 6.13) show that the necessary tube fittings, for supplying hydraulic liquid to drive his joint, are routed outside his mechanism, rather than through it. No connections pass through the first-stage stem and ring into the inner structure.

Even in the version of Rosheim's device with so-called "internal porting" (shown in his FIGS. 6.19 and 6.20, and discussed at page 219), no connections pass through the first-stage stem and ring into the inner structure. Instead, an entirely separate hydraulic-line yoke provides entry to the central structure through pivoting seals, outboard along the axis of the first stage; and still the valve-control electrical cables appear to be routed outside the joint.

All this is entirely understandable, since connection of tubing or wires between Rosheim's hydraulic drive-and-guide structure and his sealingly smooth rings or piston would be extremely difficult if not entirely impractical. It also would render his device even more drastically cumbersome and uneconomic.

For multiple fluid, optical or electrical fluxes, true through-routing (passing through the first-stage stem and ring into the inner structure) would probably be simply prohibitive. It is accordingly fair to assume that external routing would be used for also conveying fluid or electricity across the joint, from the mounting stem to the working-head stem, in installations requiring use or delivery of fluid or electricity at the working head.

Rosheim's external routing of tubes or wires, however, presents important additional drawbacks. In his basic design with external hydraulic-line routing, the tubulations are subject to entanglement, in the course of compound motion of the joint. In joints that are used to convey a flux of fluid, light or electricity for use or delivery at the working head, in addition to using hydraulic or electrical signals to operate the joint itself, the entanglement problem will be compounded. (Inasmuch as each stage of his joint is capable of rotation only through a half-circle, this hazard may not manifest itself as a major problem in his device; but in the context of joints that provide much wider angular rotation, such as my prior and present inventions, it would be most troublesome.)

Further, many automatically operated joints must function under highly restrictive environments that may include high temperatures, welding flames or arcs, nearby fast-moving machinery, and so forth. These are all capable of severing or otherwise damaging uncontrolled loose wires or tubing.

As to Rosheim's design with "internal porting" there are several adverse consequences: the added complexity and bulkiness, and the two additional moving seals far outboard, are all highly undesirable; even if the first-stage hydraulic chamber itself did not obstruct travel of the second-stage stem, the additional hydraulic-line yoke certainly would; and as noted above, Rosheim's illustrations appear to indicate that his electrical wires would remain routed outside the joint even in the internally ported device. Finally, his already unsatisfactory "internal porting" solution would escalate in difficulty, cost and unreliability with addition of multiple fluxes for delivery or use at the working head.

In fact, Rosheim's stated motivation in putting the control valves on board the joint is to avoid "sponginess" in control, and thereby to preserve reliability and response time. He does not even suggest that it would be desirable to move tubulations (or wires) inside the joint for the purpose of eliminating rotating seals and contacts as well as exposed and possibly tangled tubes and wires.

Accordingly Rosheim does not effectively supply the above-suggested refinement of my earlier invention, in regard to economy and durability—particularly for industrial or other practical uses that impose little demand upon the esthetics of the internal guide structure.

It appears that the Rosheim publication is not prior art with respect to at least some forms of the present invention. Further, although Rosheim asserts that he invented his hydraulic wrist in 1980, none of his now-issued patents discloses it.

SUMMARY OF THE DISCLOSURE

Before offering any relatively rigorous definition, I shall present some very informal preliminary comments. These may help to orient the reader to the more formally worded passages and the details that follow.

The present document is directed to adaptations, simplifications, refinements and in some instances simply applications of my earlier interlocking-bodies joint. These are particularly (but not exclusively) suited for utilitarian functions in which it is not necessary or desired to conceal an internal guide structure; or in which the circular cross-sections of the toroids emphasized in my above-mentioned earlier patent applications are not of interest.

The refinements, applications and adaptations that are first disclosed here permit use of flexible wires, optic fibers or tubing running directly through connection stems and interlocking outer structures, into inner structures that guide the interlocking outer structures in systematic mutual movement. These flexible wires, fibers or tubes transmit electrical, optical or fluid fluxes either to utilization devices mounted on or in the internal structure (to drive or control the joint, for example), or entirely across the joint for use or delivery at the working head or otherwise.

The use of such flexible flux-transmission means is made possible in my invention by employing inner structures that are amenable to defining a sizable central hollow or cavity. The flexible wires, fibers or tubes simply bend, twist, stretch or otherwise deform within the central cavity, thereby accommodating operation through very large angles—and even several complete rotations, with appropriate production design—even though the wires, fibers or tubes are entirely conventional and inexpensive.

Remarkably, the inner structures of my invention that permit these advantageous inner features can take any of a great variety of simple, inexpensive forms, all very easily made and assembled in any general-purpose workshop. In the following pages I shall describe several specific forms that I personally prefer, but in addition I shall point out how the specific form actually employed can be virtually arbitrary, as long as certain critical but very simple guide surfaces are provided.

In my devices, even with a protruding stem, each stage can typically rotate through nearly an entire circle. In usages not requiring a protruding stem, each stage can rotate through even much larger angles. This property of my invention is of very great value in industrial and other practical use.

In my invention, the joint can be driven by motors, which can be electrical motors, or airmotors, or hydraulically driven motors. The motors are preferably discrete with respect to the major elements of the joint—that is to say, they are not integrated into the rotating body and constraining structure as are Rosheim's drive units. Because my motors are discrete, they can be conveniently positioned in any of a great variety of different positions and orientations, and as will be seen do not obstruct the motion of the joint through the very large angular rotations just mentioned.

For example, one of my motors can be mounted in a connecting stem (which of course rotates with one of the moving bodies), to drive a ring gear that is mounted to the constraining structure. This arrangement is shown and discussed in my above-mentioned earlier patent applications (FIG. 20 and associated text).

Equivalently, a motor can be positioned elsewhere in the rotating body to drive such a ring gear, or mounted on the constraining structure to drive a ring gear that is mounted to the rotating body. These latter two configurations are disclosed in greater detail below.

With the foregoing informal introduction, I shall now offer a somewhat more rigorous statement. My invention is a connective joint for interconnecting two articles for controlled relative motion.

For present purposes the word "article" is used in a quite broad sense. As to one side of the joint, this word encompasses an article such as the earth, or pavement on the ground; or a solid building, structure, floor or base—to any of which one side of the joint may be mounted.

In a preferred form, my invention includes a pair of interlocking bodies. By "interlocking" I mean mutually interlocked—that is to say, passing through and around each other. (I do not mean to imply that the bodies are necessarily secured together in such a way as to preclude ready separation, although this is likely to be so in most typical cases.)

Simply as a matter of semantics, this condition necessarily requires that each body have some minimal form that is capable of having another body pass through and around it. This condition also necessarily requires that each body be capable of passing through and around another body.

Two circular rings of course satisfy this condition, if the relationships between the cross-sections and central holes of the rings are suitable. For purposes of satisfying this condition, however, circular rings represent an extreme case of geometric regularity.

A body of my invention need not be strictly circular, or indeed generally arcuate, or even very regular, or even a completely closed shape—provided only that it does in common understanding define (1) enough of an encircling form as to pass around another body, and (2) enough of an enclosing form as to be passed through by another body. The latter limitation may also be expressed by saying that the body must define a hole; however, still as in common understanding, an opening need not be completely surrounded by material to answer to the description of a "hole".

My invention also includes some means for attaching each of the bodies to one of such "articles" respectively. For purposes of generality in expression, I shall refer to these means as the "attaching means."

My invention also includes a structure constraining the bodies for systematic relative movement.

The foregoing may be a definition of my invention in its broadest or most general form. In fact, this definition is broader than those set forth in my earlier patent applications (and is based exclusively upon the disclosure of my earlier applications)—which may be well understood, in that the present document is devoted, as mentioned above, to utilitarian uses in which certain earlier constraints are relaxed or eliminated.

I prefer, however, to practice my invention with several additional features or properties. These added characteristics operate to enhance or optimize enjoyment of the maximum benefits of the invention.

For example, a preferred form of my invention also includes some means for applying mechanical force and power to drive the bodies in the systematic relative movement mentioned above. Again for generality, these means may be referred to as the "applying means".

As another example, a preferred form of the invention also includes some means for transmitting a flux between one of the articles and the constraining structure—once again, the "flux-transmitting means". By "flux" as in my earlier patent applications I refer to a flux of electricity or of fluid (either liquid or gas); and an optical flux as well.

Any such type of flux may be transmitted only partway across the joint, as for example to operate the joint itself—that is, may drive "applying means" or a portion thereof. Alternatively, either type of flux may be transmitted entirely across the joint, from a flux source associated with one of the attaching means to some flux-utilization device or flux-delivery device associated with another of the attaching means.

These flux-transmitting means preferably transmit the flux by way of the attaching means. As will be seen, the constraining structure of my invention can be engaged with the interlocking bodies in such a way that flux can be transmitted between either article (or both articles) and the constraining structure—without interfering with reasonably free motion of the bodies upon the constraining structure.

The flux-transmitting means, in fact, advantageously take the form of flexible means—such as wires, optic fibers or tubes—for carrying the electricity, light or fluid. These flexible elements preferably pass through the constraining structure, in a hollow cavity formed within that structure, and within and protruding from attachment points along the bodies.

In yet another preferred form of the invention, which may be incorporated with those just discussed, the constraining structure includes four guides arranged in pairs. A part of each guide defines a track, part of which is shaped substantially as a portion of a circle; and each guide also defines a cutout slot extending within the circular part of the track.

In this form of the invention the two tracks of each pair are mutually substantially parallel (though not necessarily of the same diameter), and the circular track parts are substantially coaxial. By "coaxial" I mean aligned along a common axis, though not necessarily in a common plane. The two pairs of guides are interfitted so that the slots in each pair mutually engage the slots in, and the surfaces of, the other pair.

The interfitted pairs of spaced-apart guides form a substantially hollow enclosure—for passage of flexible flux-transmission means from at least one of the bodies. Each pair of tracks engages one of the two bodies respectively, for rotational motion of the bodies relative to the tracks.

In this way the guides define two mutually fixed pairs of tracks. The result is that, in the relative motion mentioned earlier, the two bodies both rotate about the hollow enclosure.

In another preferred form of the invention, the constraining structure takes a notably different form from that just discussed, and engages the interlocking bodies in a different way. Here each body defines a pair of axially spaced-apart circular followers; and the constraining structure includes four guides, each in the form of a corner.

Each corner guide includes a pair of mutually angled tracks. Each track is shaped substantially as a circular segment—but the two tracks of each corner guide have mutually offset centers. By this latter condition I mean that the centers are offset along the corner line itself, where the two circular segments intersect.

It will be understood that the geometric circles that characterize the circular segments are not in a common plane, as the tracks are mutually angled; however, the circles nonetheless do have centers, and the center of each circle can be projected onto the intersecting-segment corner line at its point of closest approach—i.e., the point where that line crosses a perpendicular radius of the corresponding circle. By the statement that the centers are offset along the corner line I thus mean, in turn, that these projection points are mutually offset along that line.

The four corner guides are disposed in a generally rectangular or square array. This statement is to be understood, for present purposes, as encompassing an array in the shape of a parallelogram—for there is no requirement that the two interlocking bodies operate at right angles to each other, although as a practical matter the simplest structures with the greatest operating ranges and greatest general-purpose utility are likely to result from rotation of the two bodies at right angles. The circular-segment tracks extend outward from the array.

In this embodiment of my invention, the pair of circular followers of each body engages four of the circular-segment tracks, respectively, for rotation of that body relative to those four tracks and accordingly relative to the corner-guide array. That is, each circular follower engages two tracks.

The corner guides form a substantially hollow enclosure for passage of the flexible flux-transmission means. As a result of the configuration described above, both bodies rotate about the hollow enclosure.

Yet another form of my invention includes traction means that are defined along at least one of the bodies. This form of the invention also includes a discrete force-applying device for engaging the traction means to drive the "at least one" body relative to the body-constraining structure. The discrete force-applying device is mounted to the body-constraining structure, but is discrete in the sense that neither the body nor the body-constraining structure is itself a functioning component of the force-applying device.

In this regard my force-applying device differs from Rosheim's drive unit, in which the force-applying devices are indistinguishable from the ring-and-guide combinations. In Rosheim, as will be recalled, each ring carries a paddle or hydraulic piston and thus serves as a circular piston ring, while each guide also serves as a hydraulic chamber.

Still another form of my invention includes traction means that are defined along the body-constraining structure, and a discrete motor, mounted to at least one of the bodies, for engaging the traction means to drive the "at least one" body relative to the constraining structure. Here too, the motor is mounted to the constraining structure, but discrete in the sense stated just above.

The last two forms or embodiments of my invention just described can be generalized for description as a single form, in the following way—emphasizing that these two forms are equivalents. This form of the invention includes a pair of body-and-constraint sets. Each of these sets includes a body member and a constraint-structure member.

Now using these definitions, traction means are defined along one member of at least one set. Mounted to the other member of that "at least one set" is a discrete motor for engaging the traction means—to drive the two members of the "at least one set" relative to each other.

As will be appreciated, this definition can be re-couched to expressly include mounting of discrete motors to drive each of the two body-and-constraint sets. In either case, the body and constraining-structure members also answer to other limitations expressed above for the rotating bodies and constraining structures, respectively.

In particular, each body member defines a hole, and least part of the body member is small enough to fit through the hole that is defined in the body member of the other set; each constraint-structure member constrains the body member of the same set for systematic movement; the body members of the two sets are interlocking; and the constraint-structure members of the two sets are interconnected so that in conjunction they constrain the two body members for systematic mutual movement.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a perspective view showing an inner guide for use in one preferred embodiment of my invention. In this particular embodiment the inner guide is a unitary solid form.

FIG. 2 is a like view showing two of the FIG. 1 guides interfitted to form a complete inner-guide structure, or body-constraining structure.

FIG. 6 is a like view of two inner guides for use in yet a third preferred embodiment, from which have been omitted the three planar walls also. In this embodiment only the discs remain, and these can be mutually positioned by other elements—namely, for example, either interconnecting pillars, or mating surfaces of the outer rings which ride on the guides.

FIG. 7 is a like view showing the two FIG. 6 guides interfitted.

FIG. 8 is a like view showing the two outer rings for use in the same (third) embodiment with the guide discs of FIGS. 6 and 7. These outer rings provide guide surfaces for orienting the discs.

FIG. 9 is a like view showing two stem elements for insertion into the FIG. 8 rings, to both complete the rings and provide article-attachment means in the same (third) embodiment.

FIG. 10 is a like view showing a ring gear in conjunction with one of the FIG. 8 rings.

FIG. 11 is a like view showing an embodiment that is a variant of the FIG. 10 geometry.

FIG. 12a is a cross-sectional elevation of the FIG. 11 variant embodiment, in a context similar to that of the FIG. 12 apparatus.

FIG. 13 is a perspective view similar to that of FIG. 12, but not cut away, showing the entire FIG. 12a variant embodiment ready for operation—with ring gears mounted to the connection stems on the outer rings, and drive motors mounted to the inner slotted-disc guide assembly. This view is implicitly taken in the frame of reference of the inner guide assembly: i.e., both rings (and stems) are shown as rotating about that inner assembly.

FIG. 18 is a perspective view showing the FIG. 14 corner-guide array in conjunction with two outer rings for assembly with the corner guides, in constructing the fourth embodiment of my invention.

FIG. 19 is a cross-section of the FIG. 18 parts assembled.

FIG. 23 is a like view, partially broken away, of the entire assembly that makes up the fourth embodiment of my invention—with ring gears mounted to the inner corner-guide assembly, and drive motors mounted to the stems on the outer rings. It is thus in a sense an "opposite" construction from that of FIGS. 12 through 14, in which the ring gears are on the outer rings and the motors on the inner assembly.

FIG. 24 is a like view, but fragmentary—and focusing upon the flexible flux-transmission means as they cross through the hollow central enclosure, passing between the two outer rings.

FIG. 25 is a like view, ending in a cutoff or sectional view, showing one configuration for assembling the flux-transmission means to the outer ring.

FIG. 29 is a cross-sectional and somewhat schematic view of a sixth embodiment of my invention, which may be conceptualized as one possible cross-combination of the features of FIGS. 23 and 12. Thus, FIG. 29 shows stem-mounted motors (as in FIGS. 23 and 26) with slotted-disc guides (as in FIGS. 6, 7, 12 and 12a).

FIG. 29a is a perspective detail view of the drive geometry of FIG. 29.

Another cross-combination is shown in the seventh embodiment of FIG. 30, a cross-sectional view similar to FIG. 29.

FIG. 31 is a perspective view of an embodiment that is closely related to that of FIG. 18, but employing variant constructions for the outer bodies and stems.

FIG. 32 is a cross-sectional elevation of a portion of the outer body of FIG. 31.

FIG. 33 is a like view of a portion of the constraining structure of FIG. 31.

FIG. 34 is a like view showing interengagement of the outer-body and constraining-structure portions of FIGS. 32 and 33 respectively.

DETAILED DESCRIPTION OF THE PREFERRED EMBODIMENTS

Figure 3:
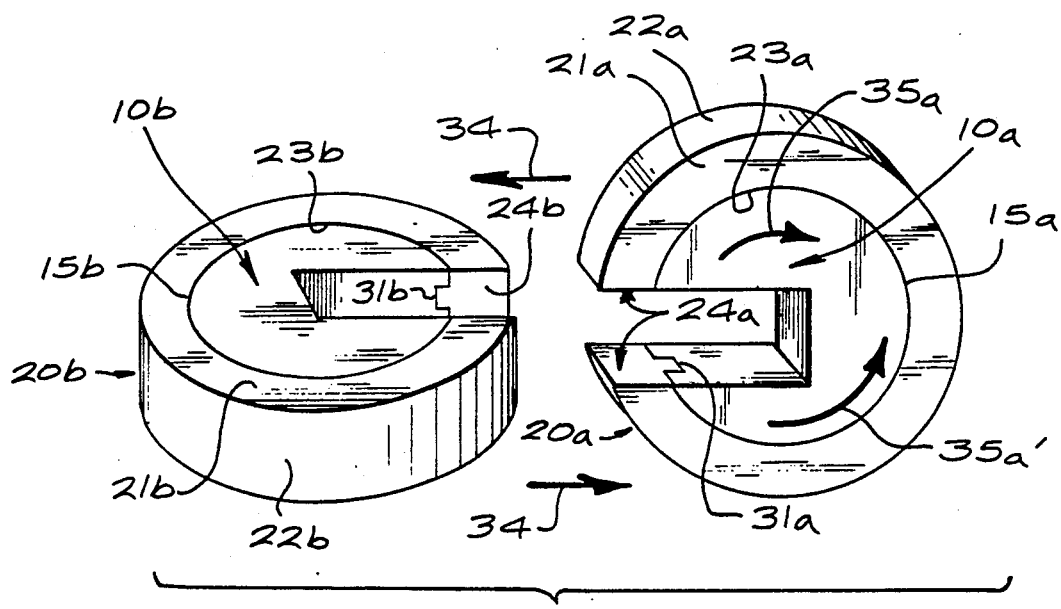
FIG. 3 is a like view showing the FIG. 2 guides not yet interfitted, but with an outer ring or body mounted for rotation to each guide.

As seen in FIG. 1, a fundamental element of one preferred form of my invention is a slotted solid right circular cylinder 10. The cylinder has a first planar end wall 11-12-13, and a second planar end wall 14.

The two end walls are separated by a generally cylindrical wall 15, which also intersects along corners 16 two planar top and bottom walls 17 and 19 of a slot or cutout 17-18-19. Interconnecting these two planar walls 17 and 19 of the slot, and within the slot, is a third planar back wall 18.

As will be clear, the three planar walls 17, 18 and 19 of the slot also separate the two planar end walls 11-1-2-13 and 14 of the cylinder. The top and bottom walls 17 and 19 are sufficiently long as to extend past the central axis of the cylinder 10.

The planar face of the first end wall 11-12-13 can be helpfully conceptualized as consisting of three portions. The reason for identifying these different areas with specificity will shortly become clear.

The "three portions" of the end wall are (1) a lower circular-segmental area 11, extending all the way across the cylinder below the bottom wall 19 of the slot; (2) an identical upper circular-segmental area 13, extending all the way across the cylinder above the top wall 17 of the slot; and (3) an intermediate area 12 between the upper and lower circular-segmental areas 11 and 13—which is to say, between the planar back wall 18 of the slot and the cylindrical surface 15' that is aligned with that planar back wall 18. The cylindrical surface 15, 15' forms a guide and support surface for operation of a mating outer body, which as will be seen can be a ring.

Two slotted cylinders 10a, 10b—each identical to the slotted cylinder 10 of FIG. 1—are shown interfitted in FIG. 2. All of the same reference numerals 11 through 19 used in FIG. 1 are used for the like elements in FIG. 2, with the addition of a suffix "a" or "b" to distinguish the corresponding elements of the two cylinders respectively.

When two FIG. 1 slotted cylinders are interfitted in this way, the surface 18 at the back of the slot 17-18-19 in one FIG. 1 slotted cylinder 10 will abut or nearly abut the surface 18 at the back of the other FIG. 1 cylinder. Those abutting surfaces cannot be seen in FIG. 2.

From FIG. 2 it can be seen, however, that the two slotted cylinders engage each other closely. It may be understood accordingly that the heights of the two cylindrical surfaces 15a and 15b very nearly equal the widths of the two corresponding slots 17-18-19b and 17-18-19a respectively.

The structure of FIG. 2 defines, among other features, four inward-extending corners between the planar circular-segmental portions 13a, 13b, etc. One of these inward-extending corners 13ab is visible in FIG. 2. The importance of the compound surface 13a-1-3ab-13b, and the four other compound surfaces formed by the two interfitted cylinders 10a, 10b will shortly become clear.

In FIG. 3 the same two slotted cylinders 10a, 10b are shown not yet interfitted, but carrying slotted outer rings 20a, 20b respectively. The outer rings may be mutually identical as shown, each with a respective pair of side walls 21a (on ring 20a) and 21b (on ring 20b), an outer generally cylindrical surface 22a, 22b; an inner generally cylindrical surface 23a, 23b, and a pair of end walls 24a (for ring 20a) and 24b (for ring 20b) where the ring is interrupted or notched.

The widths of the notches between the two surfaces 24a and between the two surfaces 24b match the widths of the two corresponding slots 17-18-19a and 17-1-

8-19b (FIG. 2) in the respective slotted cylinders 10a, 10b. Each ring 20a, 20b is coaxial with the corresponding slotted cylinder 10a, 10b and is free to rotate about the common axis either clockwise as suggested (for ring 20a) by the arrow 35a, or counterclockwise as shown by the arrow 35a'—that is, with the inner cylindrical surface 23a, 23b sliding upon the outer cylindrical surface 15a, 15b of the corresponding cylinder 10, 10b respectively.

To retain each ring 20a, 20b axially in place relative to its corresponding cylinder 10a, 10b, an inward-projecting tongue 31a, 31b may be formed or secured along the inner circumference 23a, 23b of each ring, and a mating groove defined in the outer cylindrical surface 15a, 15b of the corresponding cylinder—or conversely. (To permit assembly of these structures without interference, depending upon the degree of flexibility of the materials used for the cylinders and rings, or upon the number of pieces from which each cylinder or ring is constructed, it may be necessary to form the tongues 31a, 31b as separate strips, and to glue or otherwise affix the tongues to the rings 20a, 20b as convenient.)

As will be apparent to those skilled in the art of mechanical assemblies, any of an enormous range of equivalents may be substituted for the tongue-and-groove structure illustrated. When the two subassemblies are complete as shown in FIG. 3, they are interfitted by moving them toward each other in the directions indicated by the arrows 34.

Figure 4:
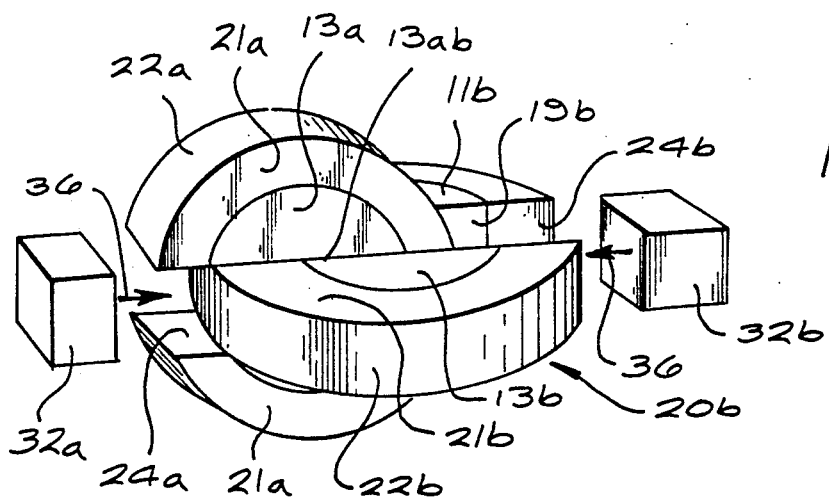
FIG. 4 is a like view showing the guides—now carrying the outer rings—interfitted as before; and with stem sections oriented for insertion into gaps in the rings, to complete the rings and thereby the assembly.

The result is then as indicated in FIG. 4. The rings 20a, 20b are then completed by addition of short annular-segmental inserts 32a, 32b respectively, which are positioned and glued or otherwise secured into the gaps defined between the surfaces 24a, 24b.

These annular-segmental inserts 32a, 32b optionally have inner cylindrical surfaces that substantially match and align with the inner cylindrical surfaces of the respective rings 20a, 20b. This alignment allows the inserts 32a, 32b to slide along the outer cylindrical surfaces 15a, 15b respectively, as continuations of the inner surfaces of the rotating rings.

After assembly, the inserts 32a, 32b preferably (in most cases) extend outward radially from their respective rings 20a, 20b. Such protrusion provides connective stems for attachment at one side of the joint to an operating base or the like, and at the other side to a working head of some sort.

The construction of FIG. 4 also exemplifies the fact that the inner structure 13a-13ab-13b, etc. need not fill all the space within each ring. Thus after an annular-segmental insert 32b is fitted into the gap 24b in one ring 20b—in such a way that the inner cylindrical surface of the insert 32b is aligned with the matching inner cylindrical surface 23a of the ring 20a, a portion of the inner planar wall 19b (that defines the slot 17b-18b-19b in the corresponding cylinder 10b) yet remains exposed. If desired, the gap can be used to accommodate great radial irregularity in the "ring" or body surface geometry, which can accordingly be arbitrary.

The solid construction of FIGS. 1 through 4 is capable of serving as a mechanical joint in accordance with my invention as most broadly defined earlier in this document. This construction can be fitted with slip rings or sliding tubing fittings for transmission of electrical, optical or fluid fluxes into or across the joint—generally as described in my previously mentioned patent applications.

For particularly convenient and economical flux transmission into or across the joint, however, benefits accrue from eliminating most of the solid interiors of the slotted cylinders 10a, 10b. Flexible transmission means can then pass through the interior of the compound inner structure 10a, 10b without impeding rotation of the rings upon the cylinders.

Figure 5:
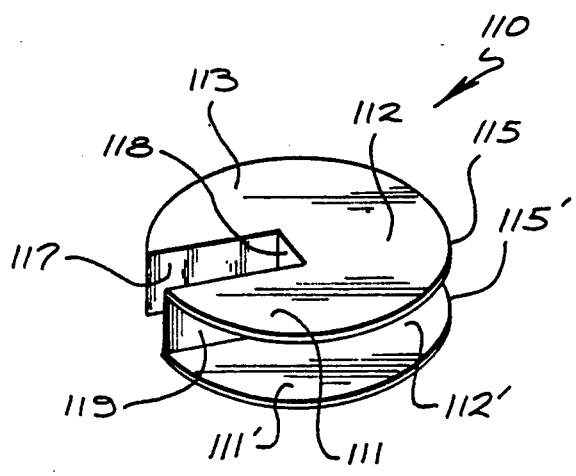
FIG. 5 is a like view showing an inner guide for use in a different preferred embodiment. This inner guide is in essence a shell or skeleton, in which only certain functional surfaces of the FIG. 1 guide are retained while most of the mass or bulk is omitted. In this embodiment, the retained functional portions include two opposing thin discs, and three thin planar connecting walls mutually stabilizing the discs.

One way in which this can be done is to form each of the slotted cylinders as only a shell or exoskeleton—omitting almost all of the cylindrical surfaces—as shown in FIG. 5. Thin slotted discs 111-112-113, 111'-112' are retained; they are interconnected only by thin planar walls 117, 118, 119 defining the original (FIG. 1) "slot" as shown.

In FIG. 5 and all of the remaining drawings (except FIG. 20) in this document, the same reference numerals are employed as in FIGS. 1 through 4 for like elements, but with an additional prefix distinguishing the various embodiments from one another. Thus in FIG. 5 the prefix is a single numeral "1", so that the FIG. 1 surface "13" becomes in FIG. 5 a corresponding surface "113"; and in FIGS. 18 and 21 the prefix is "3" so that the corresponding surface becomes (with an additional suffix explained earlier) a surface "313a"; etc.

In FIG. 5 the cylindrical wall of FIG. 1 is almost entirely eliminated, leaving only the thin generally cylindrical surfaces or edges 115, 115' of the thin discs 112, 112' respectively. These edges 115, 115' can serve as tracks or guides for an outer ring (not shown).

In this drawing and many of those that follow, an apostrophe or "prime" sign is appended to the reference numerals of one in each pair of thin discs that are parallel, aligned and spaced apart—to distinguish them from each other. The same notation is also used to distinguish features or parts of these disc pairs, and other components such as motors that are associated with the individual discs. (The prime sign is also used in the drawings of this document in various other ways and for different purposes, as will be clear from the context.)

The outer ring can be annularly grooved or otherwise fashioned to ride upon and engage the tracks or guide edges 115, 115'. With two such shell-like cylinders and a pair of mating rings, interfitted as in FIG. 4, the resulting structure can function exactly as that of FIG. 4—except for the saving in material, and the added capability for passing flexible connections through the hollow space.

In regard to the passage of such connections, it will be understood that such connections must somehow traverse the back-wall panel 118—and, in fact, two of such panels, since the slot back-wall panel 118 of each shell cylinder will abut the corresponding panel of the other, just as the two slot back-wall surfaces 18 of two solid FIG. 1 cylinders abut when the two solid cylinders are interfitted as in FIG. 2.

These necessary through-connections can be fastened securely into the abutting slot back-wall panel 118, as for example by a conventional strain-relief device. Alternatively, they can be passed loosely through oversize apertures in that panel.

An even more satisfactory construction of the inner guides, however, is shown in FIGS. 6 and 7. Now it can be appreciated that four identical thin discs 210a, 210a', 210b, 210b' suffice to provide four cylindrical tracks 215a, 215a', etc. for constraining the motion of two outer rings.

The discs 210a, 210a' are spaced apart, and the discs 210b, 210b' are likewise spaced apart, in pairs to form a generally rectangular array as shown in FIG. 7—just as if the walls 117, 118, 119 were still present. This spacing can be accomplished in any of a large variety of ways.

For example, four discs can be arranged in the FIG. 7 array by gluing or otherwise securing them together along the inside corner lines 211*ab*, or in any event at enough points where the discs make contact to stabilize the structure. Alternatively, the discs can be held apart, and in position, by interconnecting pillars or the like. Still otherwise, the entire FIG. 7 array can be molded in, e.g., one piece.

I have found, however, that for many practical structures of a lightweight, light-duty character it suffices to space the discs apart by means of the follower surfaces, defined in the mating outer rings, that ride upon the disc edges. Such a function can be performed, for example, by the angled follower grooves 226*a*, 226*a'*, 226*b*, 226*b'* shown in FIG. 8.

The rings in FIG. 8 are otherwise very similar to those of FIGS. 3 and 4, having respective gaps 224*a*, 224*b* that are closed by mating annular-segmental inserts 232*a*, 232*b* (FIG. 9) respectively. Integral with these inserts are attachment stems 233*a*, 233*b*—provided for the purposes indicated earlier, and also elaborated in my previously mentioned patent applications. The two insert-and-stem assemblies 230*a*, 230*b* can be mutually identical if the rings 220*a*, 220*b* are identical.

In applications of my invention for robotics and other self-actuating devices, it is desirable to apply force between force-applying means such as a motor/driving-gear combination and some force-receiving or traction means such as a receiving gear. A receiving gear may for instance take the form of a ring gear, fixed either to the interlocking rings (or other bodies) of my invention or to the inner guide structure.

FIG. 10 illustrates such a ring gear 250, that can be fixed at the side of one of the rings 220 already introduced above. The ring gear 250 can be an arcuate annulus 251 with a gap 253, gear teeth 252 formed along an inner circular periphery, and holes 254 for mounting screws 254'.

The gear 250 is assembled to the ring 220 by moving the gear against the ring as suggested by the arrow 235, and then inserting and tightening the mounting screws 254'. The same result can be obtained—where suitable in terms of material strength, production volume, and so forth—by molding the ring 220 and gear teeth 252 integrally, with the teeth 252 formed in the side 221 of the ring 220.

For optimum rotational range of the complete assembly, the gap 253 in the ring gear 250 is not aligned with the gap 224 in the ring 220, although such alignment might seem intuitively to be appropriate. Rather, the gap in the ring gear should be oriented so that it is diametrically opposite the position along the ring where the ring gear engages the motor-powered driving gear, when the joint is fully extended—i.e., with the two stems substantially aligned. This condition will be further discussed shortly.

The ring-gear teeth need not be along the outside edge of the ring 220, but can instead be further inboard, between the two dovetail grooves that will ride on the slotted-disc tracks 215*a*, 215*a'*, 215*b*, 215*b'* of FIGS. 6 and 7. In this alternative configuration, shown by FIG. 11, all the gear teeth will be within the structure, concealed and protected between the slotted discs; this form too may either be assembled from two pieces or molded as a unitary component.

For many applications the FIG. 11 variant will be preferred for reasons of safety and reduced noise. In environments involving corrosive atmospheres, flying metal chips, and the like, this variant embodiment may also require less maintenance. For other applications, however, the FIG. 10 configuration may be preferred because it permits readier wear inspection of the gear teeth, or possibly just because it is more interesting or engaging to watch in operation.

Figure 12:
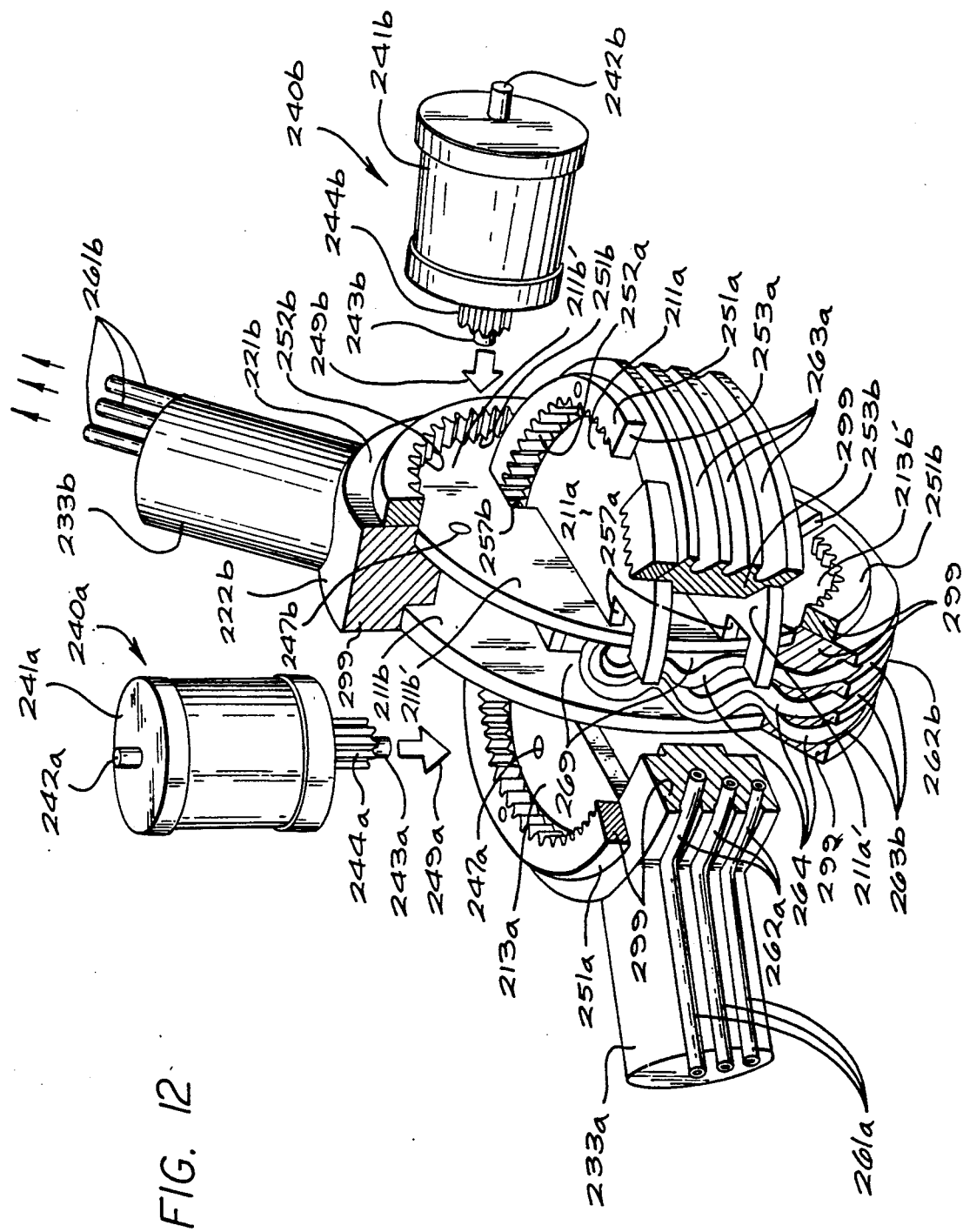
FIG. 12 is a like view, partially broken away, showing motor means and flux-transmission means, in conjunction with the above-enumerated components of the FIG. 10 embodiment.

In FIG. 12, the FIG. 10 ring-and-ring-gear configuration is shown assembled with the slotted-disc guide structure 210*a*-210*a'*-210*b*-210*b'* of FIGS. 6 and 7—all incorporated into a complete self-moving joint, together with motors 240*a*, 240*b* and flux-transmission means 261*a*-262*a*-264-262*b*-261*b*. Some components are drawn broken away, at 299, for a view of the interior. In the particular arrangement illustrated, the slotted disc portions 211*b'*, 211*a* and 211*a'* are notched as at 257*b*, 257*a* (and at other points not visible in the drawing) for passage of the respective ring gears 251*a*, 252*b*.

Each motor 240*a*, 240*b* may be powered by, e.g., air, electricity or hydraulic fluid, and controlled by pneumatic, electrical, hydraulic or optical signals. Each motor has a drive shaft 242*a*—243*a*, 242*b*-243*b*, which near its inboard end carries a drive pinion 244*a*, 244*b* and is journalled into a respective portion 213*a*, 211*b'* of one of the slotted discs.

Each motor is further fixed to the central compound guide structure by a bracket (not shown in FIG. 12). Further, each motor is secured in such a position that its drive pinion 244*a*, 244*b* engages the teeth 252*a*, 252*b* of the corresponding ring gear.

As previously mentioned, the gap 253*a*, 253*b* in each ring gear is angularly offset along the ring from the respective stem 233*a*, 233*b*. This condition is necessary to avoid limiting the driven rotation of the stem by running either drive pinion 244*a*, 244*b* off the end of its own ring gear 251*a*, 25*ab*. (An alternative is to assemble the ring gear of two segments, or otherwise form the ring gear, with no gap.)

More specifically, when the stems 233*a* and 233*b* are aligned linearly with each other, each motor pinion 244*a*, 244*b* should be at the midpoint of its relative travel along its respective ring gear 251*a*, 251*b*—so that the stem 233*a*, 233*b* on each ring can rotate fully against either side 221*b*, 221*a* of the other ring (or against the side 251*b*, 251*a* of the other ring gear) before the drive pinion 244*a*, 244*b* runs off either end of its own ring gear 251*a*, 251*b*.

As can be visualized from FIG. 12, when the upper stem 233*b* is rotated downward and backward (i.e., rightward and into the plane of the drawing) the gap 253*b* in the associated ring gear 251*b* will move from the bottom of the drawing upward and forward (i.e., leftward and out of the plane of the drawing). During all of this motion, the motor-shaft journal 247*b* remains in the illustrated position: what is under discussion here is rotation of the ring 221*b* which appears vertical in the drawing, about the central compound structure, while the latter structure remains stationary.

As this motion continues, the axis of the upper stem 233*b* will soon reach a point at which it is essentially in the plane of the ring 251*a* that appears horizontal in FIG. 12. At that point, that upper stem 233*b* is in the middle of its travel—halfway between impinging upon one side or the other of the horizontal ring 251*a*. At that same point the associated ring gear 251*b* must be oriented so that it too is at the center of its travel relative to its drive pinion 244b—halfway between the points at which it would run off into the gap 253b in one direction or the other.

This condition is satisfied if the gap 253b is diametrically opposite the motor-shaft journal 247b in the associated disc 221b. For a motor-shaft journal 247a, 247b formed where shown in FIG. 12, a roughly correct position for the ring-gear gap 253 relative to the ring gap 224 appears in FIG. 10.

Given the foregoing insights and information, a person skilled in the art of mechanical design will be able to find the correct position very readily by calculation or by actually aligning the apparatus as described above and holding it in that position while selected the mounting orientation for the ring gear. Of course the analogous alignment must be made for the other ring gear on the other ring.

FIG. 12 also shows how to route flux-transmission means of a flexible construction—that is, typically flexible wires, optic fibers, tubing or the like—through the central cavity 269, without reducing the angular operating range of either stem. By reference to FIGS. 12 and 7 in conjunction, one may visualize the fact that transmission means protruding inward from an inner surface of the "horizontal" ring 221a (FIG. 12) have access to the space between the two "horizontal" discs 210a, 210a' (FIG. 7) without interruption, while the ring 221a rotates—except when the ring reaches a position at which the transmission means are at the gap or slot 217a (FIG. 7).

In operation, that gap is always occupied—by the "vertical" ring 221b (FIG. 12). Therefore that vertical ring 221b can obstruct inward-protruding transmission means, when they reach the gap 217a.

To maximize the angular operating range of the "horizontal" ring, therefore, the transmission means should protrude inward from the inner surface of the ring 221a at a point along that inner surface which never reached the gap 217a. This can be accomplished, for there is such a point—remembering that angular rotation of the stem 233a (FIG. 12) is limited by impingement on either side of the other ring 221b.

The stem 233a, however, protrudes outward from its ring 221a; whereas the transmission means are to protrude inward. Accordingly, although the transmission means impinge upon the vertical ring 221b at the point where that ring passes just inside the horizontal ring 221a, the stem impinges upon the vertical ring 221b at the point where that ring passes just outside the horizontal ring 221a.

A solution is to introduce the transmission means into the interior space at a point along the inside of the ring 221a that is diametrally opposite the stem 233a on that same ring. This condition establishes that only when the outward-projecting stem 233a is rotated almost halfway around in either direction to impinge upon the vertical ring, where it passes just outside the horizontal ring, will the transmission means approach impingement upon the vertical ring where it passes just inside.

To prevent potential damage through actual impingement of the transmission means, the area through which the transmission means protrude inward need only be made slightly narrower in angular extent than the stem. FIG. 12 illustrates part of the mechanics for laying the transmission means along a route where they cannot impede the angular operating range of either stem and where they cannot become tangled.

Specifically, the wires, optical fibers, tubing or the like are preferably introduced into the joint through or along one stem 233a, and can then be routed along circumferential paths 262a as for example within grooves 263a in an outer surface of the associated ring 221a. Alternatively they may be routed along an inner surface, or embedded within the ring; or some of the transmission means may follow one path while other transmission means follow one or more different paths. In any of these cases, the transmission means follow the ring to a point (not visible in FIG. 12) that is diametrically opposite the entry stem 233a.

At that point the transmission means pass from the ring into the inner structure, and more specifically into the space between the two "horizontal" slotted discs 211a-213a, 211a'—that is, between the two "horizontal" discs 210a and 210a' of FIGS. 6 and 7. From that entry region, the transmission means lead to the similar space 269 (FIG. 12) that is between the two "vertical" discs 210b and 210b' of FIGS. 6 and 7.

From this latter cavity 269, the flexible transmission means pass through (or into, or attach to) the "vertical" ring 221b. In the particular system illustrated in FIG. 12, they again follow an exterior circumferential path 262b, laid along grooves 263b in the exterior surface of the ring, to the stem 233b of the "vertical" ring 221b. The transmission means 261b then pass through or along that stem 233b and out of the joint.

Whereas FIG. 12 illustrates an assembly that incorporates exterior ring gears like the gear 250 in FIG. 10, FIG. 12a illustrates the incorporation of an interior ring gear 552 like the gear 552, 552' in FIG. 11. Here the motor shaft 543a passes entirely through, rather than being journalled in, the disc 513a—so that the drive pinion can be engaged with the ring gear 552a inside the space between the two horizontal discs 513a, 513a'.

As will be noted, the system of FIG. 12a is otherwise very similar to FIG. 12, following all of the same principles just detailed for angular alignment of the ring-gear gap, and for location of the inward-protrusion point of the transmission means from each ring 521a, 521b'. Particularly included in FIG. 12a are the central cavity 569 that makes possible the use of flexible transmission means; and a motor bracket 548a which, as shown, can secure the motor casing 541a to a different disc 511b than the disc 513a through which the motor shaft 543a passes.

The external appearance of the FIG. 12a system appears in perspective in FIG. 13, which as will be understood is very similar in appearance to the system of FIG. 12—the major difference being that the drive pinions and ring gears are concealed out of view inside the FIG. 13 structure. FIG. 13 also illustrates that the shapes of the stems 233a, 233b need not be mutually identical, and in fact can be virtually arbitrary provided that they are not so wide—in their respective directions 235a—235a', 235b—235b' of rotation—as to unduly limit their angular operating ranges.

In FIG. 13 as in earlier illustrations, the motors are shown as mounted to the inner guide structure. This is not a necessary condition, and as will be shown later the motors can be mounted to the rings—or even in the stems.

Figure 14:
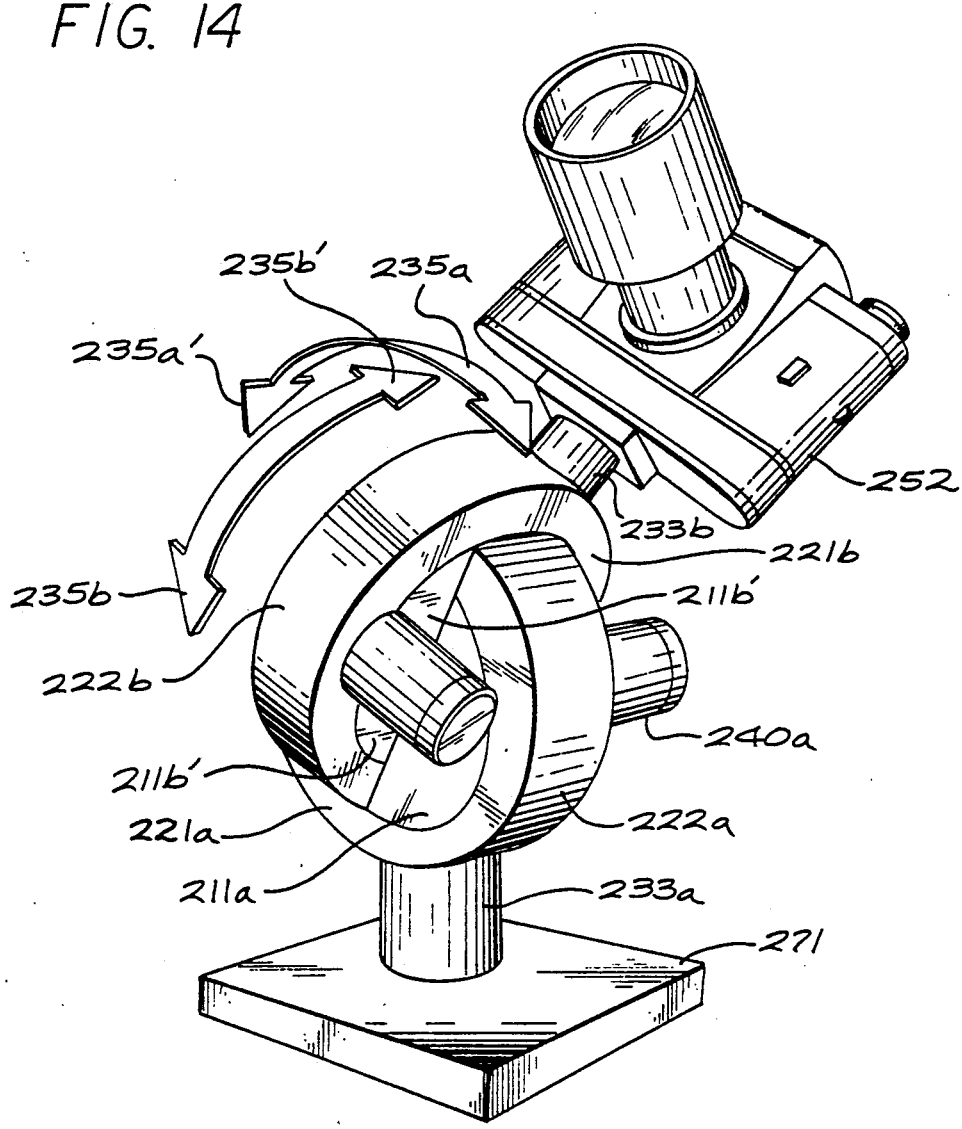
FIG. 14 is a like view showing the FIG. 12a embodiment in a more typical or practical context: one ring is fixed to a base that is taken as stationary; the inner assembly rotating within that fixed ring, and the second ring rotating about the inner assembly. This view is in effect taken from the frame of reference of the stationary base, or the world—the so-called "inertial frame" of reference. (In terms of relative motion of the inner structure with respect to the rings, there is no difference between the two points of view.)

FIG. 14 can be understood to illustrate the same joint, but more explicitly in the inertial frame. That is to say, one stem 233a is mounted to a generally stationary base 271; and accordingly that stem 233a and its associated ring 221a-222a are themselves generally stationary—although, if desired, an additional degree of freedom can be obtained by rotation of the stem 233a, about its own axis, relative to the base 271 or relative to the ring 221a-222a.

In this case the relative motion of that stem 233a and ring 221a-222a with respect to the inner guide structure 211a-211b' etc. accordingly takes the form of rotation of the guide structure—within the stationary ring. The relative motion of the second ring 221b-222b then is the more intuitively direct rotation of that second ring about the guide structure.

A representative article is shown as mounted to the second stem 233b, for rotation with the second ring 221b, 222b. This is a type of item which may be usefully positioned automatically, or by manual operation of a gear-to-gear mechanism for fine adjustment—or even by completely manual operation.

Accordingly although, as noted above, the elements marked 240a and 240b in FIG. 14 may represent the motors discussed earlier in connection with FIGS. 12, 12a and 13, these elements 240a, 240b are to be taken as alternatively representing certain other mechanical components. First, they can be manually rotated knobs, connected to drive pinions 244a, 244b of FIG. 12—to advance the mechanism along the two ring gears as in the automatic operation described previously.

Second, the elements 240a, 240b can be taken instead simply as handles for direct manipulation of the rings 221a, 221b. In this variant of the FIG. 14 embodiment, there are no internal gears at all—neither pinions nor ring gears—and the relative rotation of the rings 221a, 221b with respect to the inner guides 210a, 210a', 210b, 210b' is effected simply as a sliding motion.

If desired the handles 240a, 240b can be rotatably fixed to screw shafts that are threaded into the inner guide structure. They can thereby also serve as screw clamps, to hold the respective rings 221a, 221b in place on the inner structure.

All of these FIG. 14 variants just discussed are fully compatible with flux transmission through the joint, as already described.

Appearing in each of FIGS. 7, 12, 13 and 14 is a conspicuous substructure, the internal-corner shape formed by the two circular-segmental disc portions 211a and 211b' in the upperright quadrant of the illustration. These two segments 211a, 211b' intersect at an internal-corner line 211ab—as pointed out above in discussion of FIG. 2, with respect to the analogous segmental surfaces 13a, 13b and the corner line 13ab.

This observation has led me to realize that these corner shapes themselves, rather than the individual discs, can be treated as the fundamental units of the inner guide structure. Each of these corner shapes can be isolated as a one-piece element 310ab, shown in FIG. 15.

Here the two adjacent segments are 313a (with circular-segmental guide edge 315a) and 311b (with a like track 315b). These intersect along the internal-corner line 311b/313a.

Figure 15:
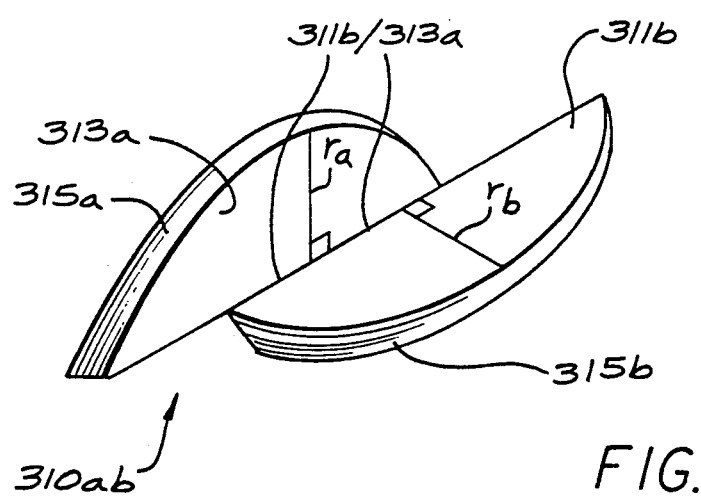
FIG. 15 is a like view showing an inner guide for use in a fourth embodiment of my invention. This is a corner guide, described and discussed previously.

Also appearing in FIG. 15 are two purely geometric reference lines: radii $r_a$ and $r_b$ of the two circles of which the guide edges 315a, 315b are respective segments. These radii are both constructed perpendicular to the corner line 311b/313a; therefore their respective intersections with that corner line represent the closest points along that line to the centers of the two circles respectively.

FIG. 15 thus demonstrates that the centers of the two circles are mutually offset along the intersection line 311b/313a. To couch this in more mechanical terms, since only the segments rather than the full circles are present, the centers of the two segments are mutually offset.

The article shown in FIG. 15 is somewhat abstract in that the two segments are joined only along a geometric line, which of course as no structural strength. The two segments accordingly can be extended, along their common corner line, to form a solid connection region as illustrated most clearly in FIGS. 17, 18, 19, 21 and 23.

Figure 16:
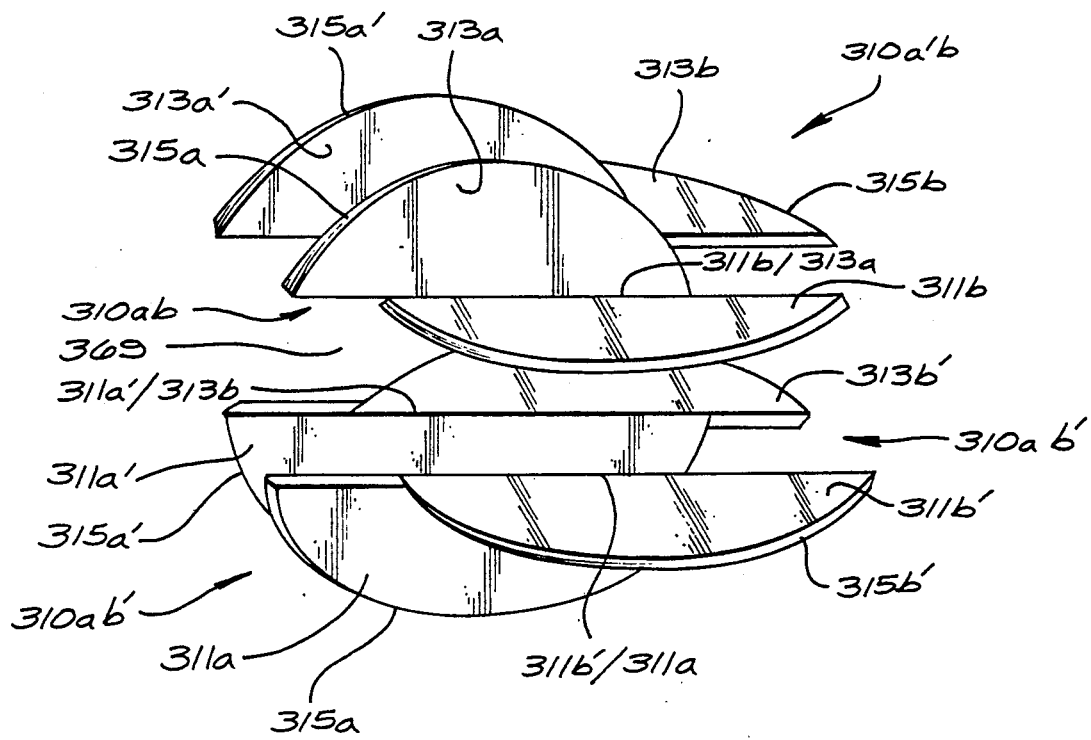
FIG. 16 is a like view of four corner guides, two of which are identical to that of FIG. 14, arrayed in correct relative position.

FIG. 16 shows a full arrary of four corners 310ab, 310ab', 310a'b and 310a'b' used in an operating joint according to my invention. The segments that make up these four corners are identified according to the reference-numeral notation defined earlier in this document.

By careful consideration of FIG. 16 one can recognize that the diagonally opposite corners 310ab and 310a'b' are identical to each other, and accordingly this pair of corners is interchangeable. Similarly, the remaining two diagonally opposite corners 310a'b and 310ab' are identical to each other—constituting another pair of interchangeable corners.

The structure does, however, have an asymmetry or handedness. The two pairs are different from one another, and not interchangeable. This is very important as a practical matter because it means that two different types of corners, not just one type of corner, must be manufactured.

The geometry of the FIG. 16 corner array can be maintained by the rings that rotate upon it, while conversely the rings are kept in position by the corner array. In other words, the structural elements can be made mutually interdependent, as shown in FIG. 17.

For this purpose the edges 315a, 315a', 315b, 315b' of the corner segments are formed with dovetail cross-sections as illustrated, to engage complementary shapes (similar to those shown in FIG. 8 at 226a, 226a', 226b, 226b') along the inner edges of the rings 320a, 320b. As FIG. 17 makes clear, the interior cavity 369 of the corner-guide structure is even more open or unobstructed than that of the crossed-disc structure discussed earlier.

Figure 17:
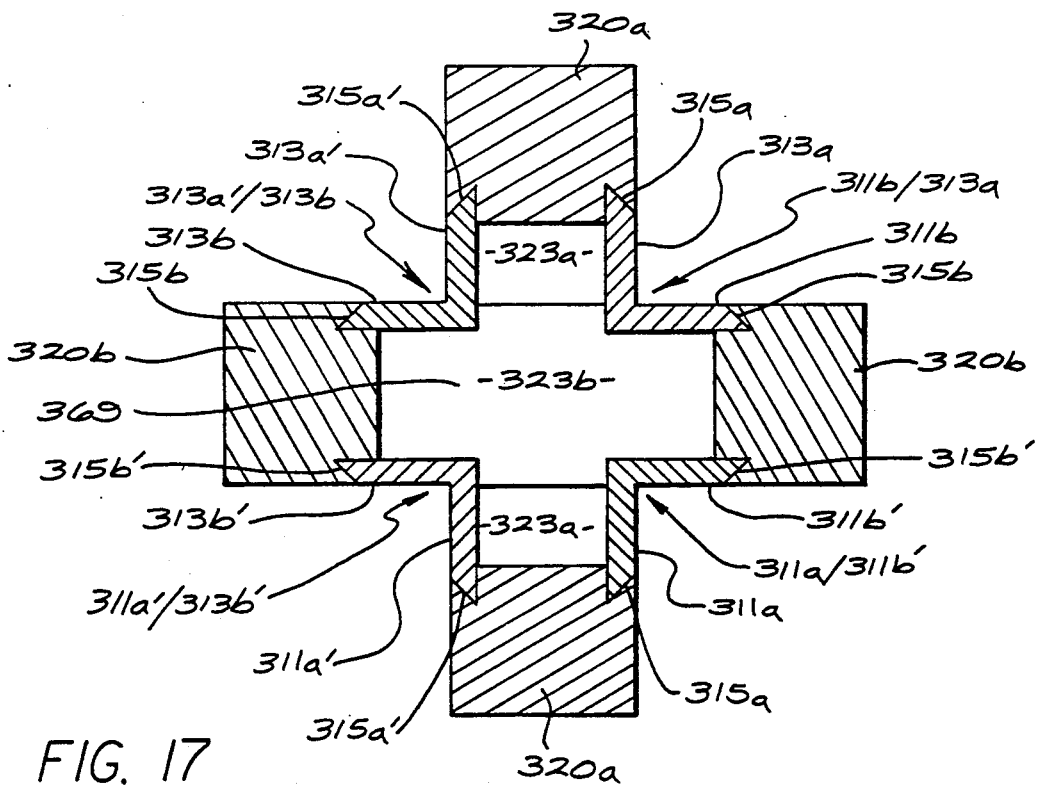
FIG. 17 is a cross-sectional elevation of the FIG. 14 array, taken "end on", assembled with two outer rings.

In the system of FIG. 17, it is particularly easy to lock the rings 320a, 320b in place on the guide structure. This can be accomplished simply by passing a bolt or the like (not shown) diagonally through holes (not shown) in any two opposite corners—e.g., between the corner 311a'/313b' and the corner 311b/313a—and tightening the bolt to jam the entire assembly.

FIGS. 18 and 19 show a similar structure, using square-cross-section guide edges, that is assembled from split rings 321a, 321a', 322b, 322b' that have integrally formed split stems 333a, 333a', 333b, 333b'. Only one ring actually need be split, to allow interlocking; but splitting both reduces tooling cost. Flux-transmission means can be threaded through holes 337a, 337b—337b' in the half-stems 333a, 333b.

This corner-guide embodiment can be adapted for heavier-duty applications, and motorized as well. If desired, the motors can be mounted in the stems; the result is closely related to an embodiment first presented in my above-mentioned earlier patent applications and repeated here at FIG. 20.

Figures 20, 30:
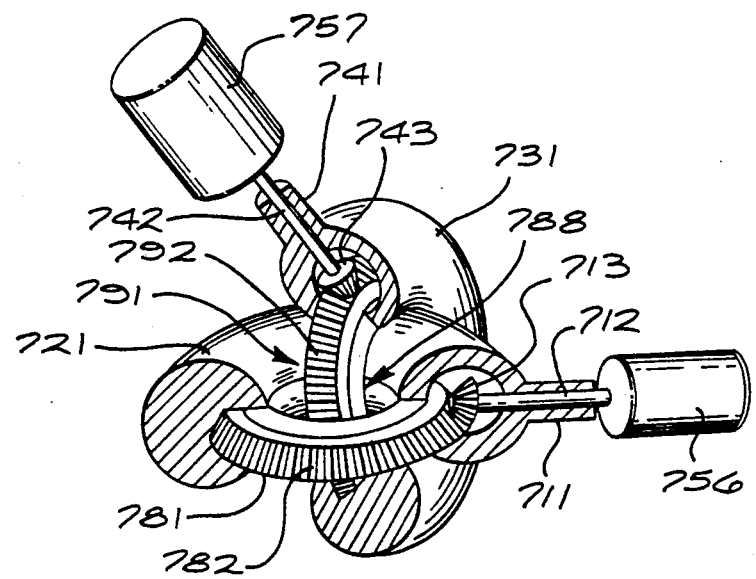
FIG. 20 is a perspective view, partially broken away, of an assembly first disclosed in my above-mentioned earlier patent applications, and conceptually related to the fourth embodiment of my invention.
FIG. 30 shows inner-structure-mounted motors (as in FIG. 12) with corner guides (as in FIG. 23). From a comparison of FIGS. 12, 23, 29 and 30 it will be understood that the features illustrated are to some degree independent.

The toroids 721 and 731 of FIG. 20 are provided, around the peripheries of their central apertures, with internal grooves. Internal rings 781 and 791 respectively are fitted within these grooves.

The internal rings 781 and 791 are mutually interlocked, and are mutually fixed at a common area 788 along the inner peripheries of both rings. The rings 781 and 791 are provided with force-transmitting surfaces 782 and 792 respectively.

The force-transmitting surfaces 782 and 792 are thus defined along very generally circular paths within the respective toroids. Disposed in respective engagement with these surfaces 782 and 792 are mating force-transmitting elements 713 and 743.

These elements 713 and 743 are mounted for rotation in the respective toroidal bodies 721 and 731. Although the force-transmitting elements 713 and 743 are free to rotate about their own axes, those axes are fixed in position along the endless toroidal bodies 721, 731.

The force-transmitting elements 713 and 743 are so shaped, and are engaged with the force-transmitting surfaces 782 and 792 in such a way, that when the elements 713 and 743 rotate they force the force-transmitting surfaces 782 and 792 to move relative to the rotational-axis locations. In other words, the force-transmitting surfaces 782 and 792 are forced to move within the grooves in the toroidal bodies 721 and 731.

Such motion of the surfaces 782 and 792 of course requires motion of the inner rings 781 and 791 along which the force-transmitting surfaces are defined. Consequently the inner rings 781 and 791 rotate relative to the toroids 721 and 731.

Connection elements 711 and 741 are provided on the toroids 721 and 731, at the fixed positions desired for the rotational axes of the force-transmitting elements 713 and 743. Motor casings 756 and 757 are fixed to the connection points 711, 741, and the driveshafts 712 and 742 of the motors are journalled through the bodies of the toroids 721 and 731.

The ends of these driveshafts remote from their motors are fixed to the force-transmitting elements 713 and 743 in such a way that operation of the motors rotates the force-transmitting elements, resulting as previously stated in motion of the inner rings 781 and 791 relative to the toroidal bodies 721 and 731 respectively.

For greatest strength and transmission of relatively large forces, the force-transmitting surfaces 782 and 792 may be annular gear teeth defined in the rings 781 and 791. The force-transmitting elements 713 and 743, naturally, are then pinion gears adapted to drive the gear teeth 782 and 792.

Various sorts of gears may be employed, including the bevel ring gears 782, 792 and matching conical pinions 713, 743 illustrated in FIG. 20. Straight and even helical drive gears may be substituted for various purposes, with appropriate reconfiguration of the two ring gears 781, 791.

The selection of particular gearing forms should be appropriate to the different force levels, speeds, and other details of each application at hand. Suitable selection and design criteria for such gearing will be clear to those skilled in the art of mechanical design.

As will also be clear to such skilled artisans, it is not necessary to use gears at all. Rather, for some applications, a traction surface may be substituted for either or both of the gear sets 782 and 792; and mating drive wheels may be substituted for either or both of the pinions 713 and 743.

Suitable materials for both the traction surface at 782 or 792 and the drive wheels at 713 and 743 may include elastomers with various degrees of resiliency and tack. Generally smoother operation and finer adjustment increments will be available with such systems, though for relatively lower levels of transmitted force.

The motors 756 and 757 may be entirely concealed with the connection points 711, 741 or even within the toroidal bodies 721, 731; or they may be in plain view. The motors may share the connection points 711, 741 with articles to be connected to the joint for mutual motion; or separate connection means for such articles may be provided along the peripheries of the toroids.

Furthermore, the motors may be electrical, air, or liquid motors. Their electrical, air or liquid drive power may be supplied through separate conductive wiring or tubing; or preferably, as suggested earlier, through the joint itself.

Study of FIG. 20, in conjunction with other disclosures in my earlier patent applications, will reveal that the inclusion of electrical, optical or fluid circuits within the joint is entirely compatible with the provision of tractive surfaces and elements per FIG. 20. Consequently power, fluids, or optical radiation, or any combinations of these, to manipulate the joint itself may be supplied through the joint as well as power, fluids or radiation, or combinations thereof, for other purposes.

FIG. 20 may also be taken as representing a joystick device in which the joint is manipulated manually. In such a device the elements 756 and 757 are not motors, but instead are electrical-signal or fluid-motion generators responsive to the motion of the joint.

Not only conventional electrical generators or alternators, but also modern electromechanical sensors (such as finely graduated radial-contact arrays) or electromagnetic angular-motion sensors or counters may be employed for optimum economy, and/or compatibility with modern digital-logic utilization circuits.

With all of this in mind, I shall now proceed to disclose a motorized variant of my corner-guide, hollow-inner-structure system introduced in FIGS. 15 through 19 above. The corner guides in this motorized variant appear in FIG. 21, together with ring gears 350a, 350b. The gear teeth 352a, 352b are on the outer peripheries of the gears 350a, 350b, rather than the inner peripheries as in FIGS. 10 through 12.

One ring gear 350a has clearance holes 354a for attachment by screws to the corresponding threaded holes 355a in the two forward and vertical (as illustrated) corner segments 313a and 311a. The gap 353a in the ring gear 350a in this embodiment is positioned to coincide with the space between those two corner segments 313a, 311a.

This configuration will satisfy by default the earlier-mentioned condition that the ring-gear gap be opposite to the motor-pinion gear drive point when the joint is fully extended—because the motor is itself in the stem (as in FIG. 20), and at full extension the stem is aligned with the space between the corner segments 313a, 311a.

Figure 21:
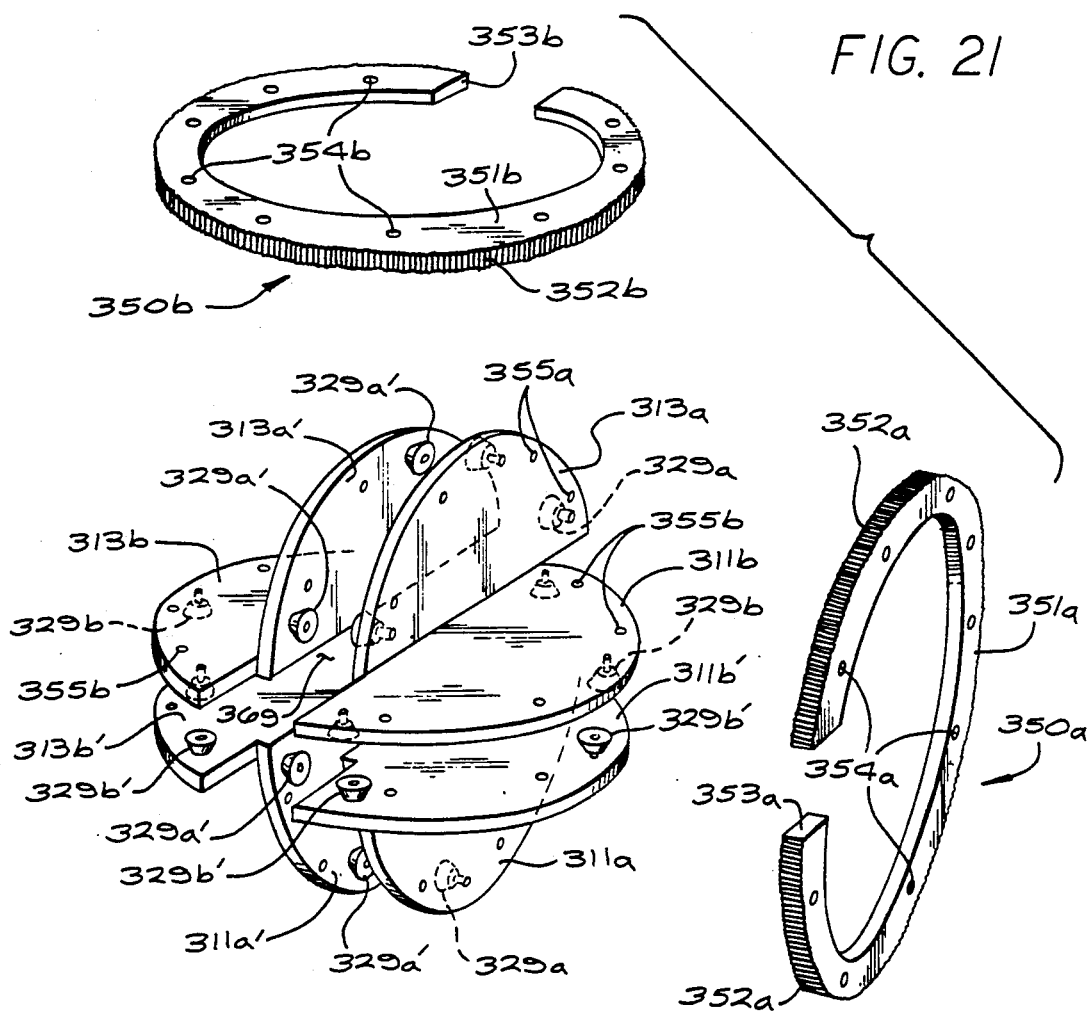
FIG. 21 is a perspective view of the corner-guide array of FIGS. 16 through 19, here shown with details of one form of rotating engagement to the outer rings or bodies, and in conjunction with two ring gears for assembly to the corner guides.

FIG. 21 also shows conical rollers 329a', 329b' mounted to the inward-facing surfaces of the corner guides, adjacent to the arcuated edges. Three rollers are shown for each segment; this gives a reasonable practical tradeoff between kinematics and force bearing, and will be suitable for many light- or medium-duty applications. For heavier systems, more rollers may be used.

Figure 22:
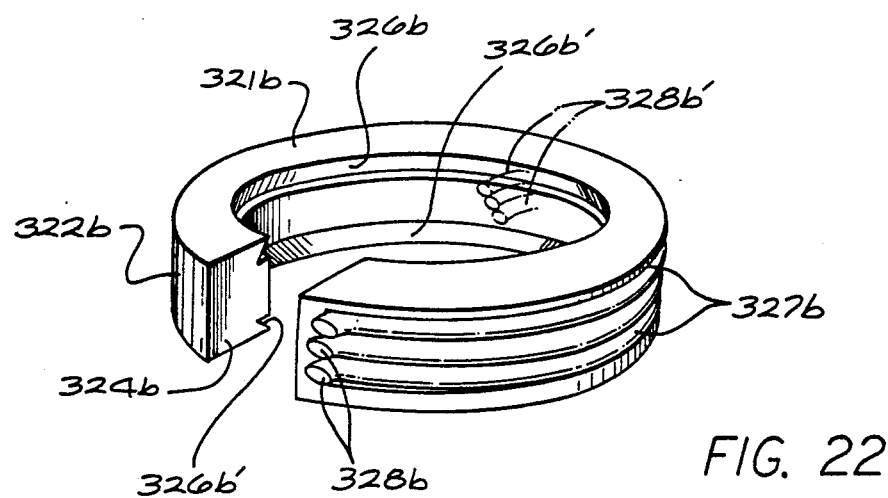
FIG. 22 is a like view of an outer ring for use with the FIG. 21 corner-guide-and-ring-gear array, and particularly showing part of flux-transmission means incorporated into the ring.

FIG. 22 shows a suitable ring for use with the corner guides and ring gears of FIG. 21. As will be recognized, this ring includes flux-transmission means 328b-328b' and is substantially identical with those used in the system of FIG. 12. Here, however, the ducktail grooves 326b, 326b' will ride on the conical rollers 329a', 329b' just discussed, rather than on angled edges of the corner guides themselves as in FIG. 12.

FIGS. 23 through 26 illustrate the resulting complete assembly, which is drawn broken away at 399 for a view of the interior. The features that are substantially the same as those in embodiments already discussed will not be described again here; the system of reference-numeral prefixes and suffixes previously established may be helpful in interpreting portions of these drawings.

Motors 341a, 341b are mounted within the stem casings 333a, 333b respectively. Each motor shaft 343a, 343b carries a worm 344a, 344b. A cross-shaft 347b in the stem casing 333b carries and is keyed to a worm gear 345b to engage the worm 344b; and also carries and is keyed to a pair of spur gears 346b, 346b' that engage the ring gears 351b.

By means of this arrangement, the motor 341b drives the spurs 346b, 346b'—through the worm 344b, worm gear 344b, and cross-shaft 347b—to run along the exterior teeth 352b of the ring gear 351b, and thereby to rotate the stem 333b itself, and with it the "horizontal" disc 321b, relative to the inner structure. Through a similar drive train the motor 341a on the stem 333a of the "vertical" disc 321a rotates that disc relative to the inner structure.

If desired, one of the stems 333a can be eliminated and the associated working head or the like flush-mounted or recessed in the corresponding vertical ring 321a. The motor 341a too can be mounted within the disc, a smaller-diameter ring gear 351a employed, and the spur gears 346a thereby recessed relative to the exterior cylindrical surface of the ring 321a. These changes would permit the vertical ring 321a to operate through more than one complete rotation—except that provision must be made to protect the flexible flux-transmission means against damage by impingement on the horizontal ring 321b.

One way to do that is to take advantage of the extra clearance available inside the vertical ring 321a, as I have generally suggested by analogy in discussion of FIG. 4 (see the exposed inner-cylinder gap surface 19b in that drawing). To provide such clearance, the vertical ring 321a can be made larger than the horizontal ring 321b, or the two rings can simply be mounted with their centers slightly farther apart.

Then, with careful design of the transmission-means harness 364 (FIG. 24) within the internal structure, the transmission means 364 can be rotated past the vertical ring 321b. A coiled or automatically fed harness, for example, may permit as many as two or four full rotations or even more; however, I have not explored such potentialities in great detail.

Figure 27:
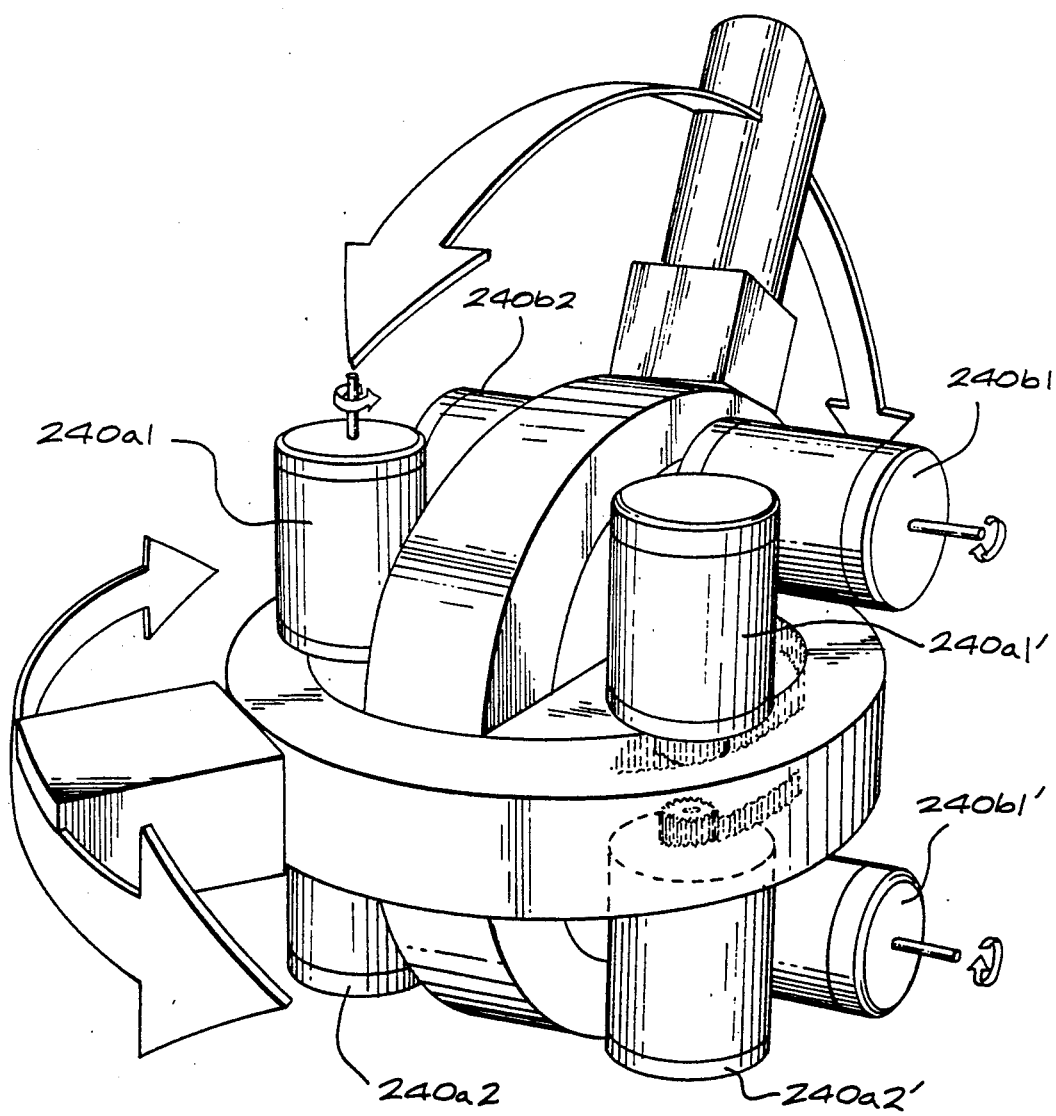
FIG. 27 is a like view of a variant of the third embodiment of FIG. 12, but incorporating four different discrete motors to drive each ring—for a total of eight motors, all mounted to the inner guides or body-constraining structure.

FIGS. 27 through 35 exemplify various interesting characteristics of my invention. FIG. 27, which is a variant of the embodiment illustrated in FIGS. 13 and 14, shows that four motors 240a1, 240a1', 240a2, 240a2' can be mounted to drive the "horizontal" ring, and if desired a like array of motors can be mounted to drive the "vertical" ring, in applications requiring additional manipulating force.

None of these motors impairs the free motion of either ring, since all eight motors are mounted to the inner guide structure and none is in the line of motion of either stem. Even further motive force can be provided without changing the geometry of the motors or of the system, simply by ganging additional motors on the driveshafts of any of the eight motors that are illustrated.

The motor 240a1' that appears in the upper right-hand quadrant of the FIG. 27 assembly, driving the horizontal ring, is engaging the same ring gear as the motor 240a1 in the upper left-hand quadrant. A single separate ring can be installed in the lower half of the horizontal ring to accommodate two lower motors 240a2, 240a2' driving that ring. Of course the same observations apply equally to the vertical ring and its motors.

Besides illustrating where additional force-applying elements can be installed, FIG. 27 also helps to clarify the more general point that the spaces in the four quadrants (between the lines of motion of the two stems) are available for installation of virtually any additional equipment, provided that it is installed to the inner guide structure rather than to the rings. In fact, within those four quadrants the guide structure need not be, or remain, an "inner" structure at all—since it can be extended far beyond the radii of the rings, beyond the radius of at least one stem, and even beyond the radius of a working head or the like installed on a stem.

Figure 28:
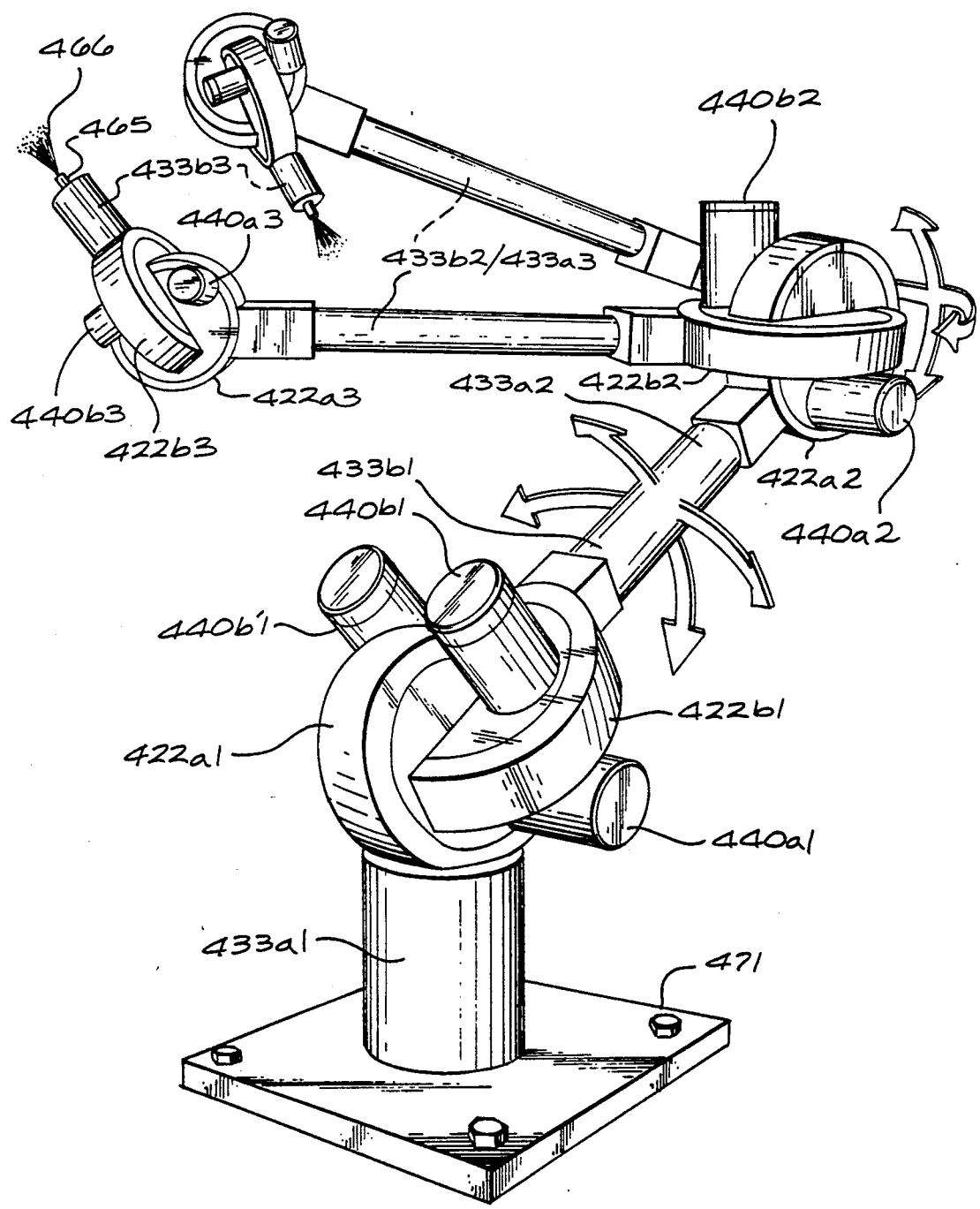
FIG. 28 is a like view, but returning to the inertial frame as in FIG. 13, of a fifth embodiment of my invention. This is a system employing three of the third-embodiment devices—all assembled in cascade, to provide a mechanical arm complete with "shoulder", "elbow" and "wrist" joints.

FIG. 28 shows that two, three or even more joints can be arranged in cascade—that is, the output stem 433b1 of the first stage can double as the input stem 433a2 of the second; and similarly for the common stem 433b2/433a3 interconnecting the second and third stages. As illustrated, a joint 422a1-422b1 that supports other joints 422a2-422b2, 422a3-422b3 can be made heavier in construction and can be provided with additional power 440b1, 440b'1, etc. as may be appropriate.

A flux 466 can be delivered through all of the joints in series to a flux-transmission-means termination or discharge device 465. Of course a flux can also be utilized to control any of the three joints, or ca be delivered from any intermediate point along the system as desired.

Figure 26:
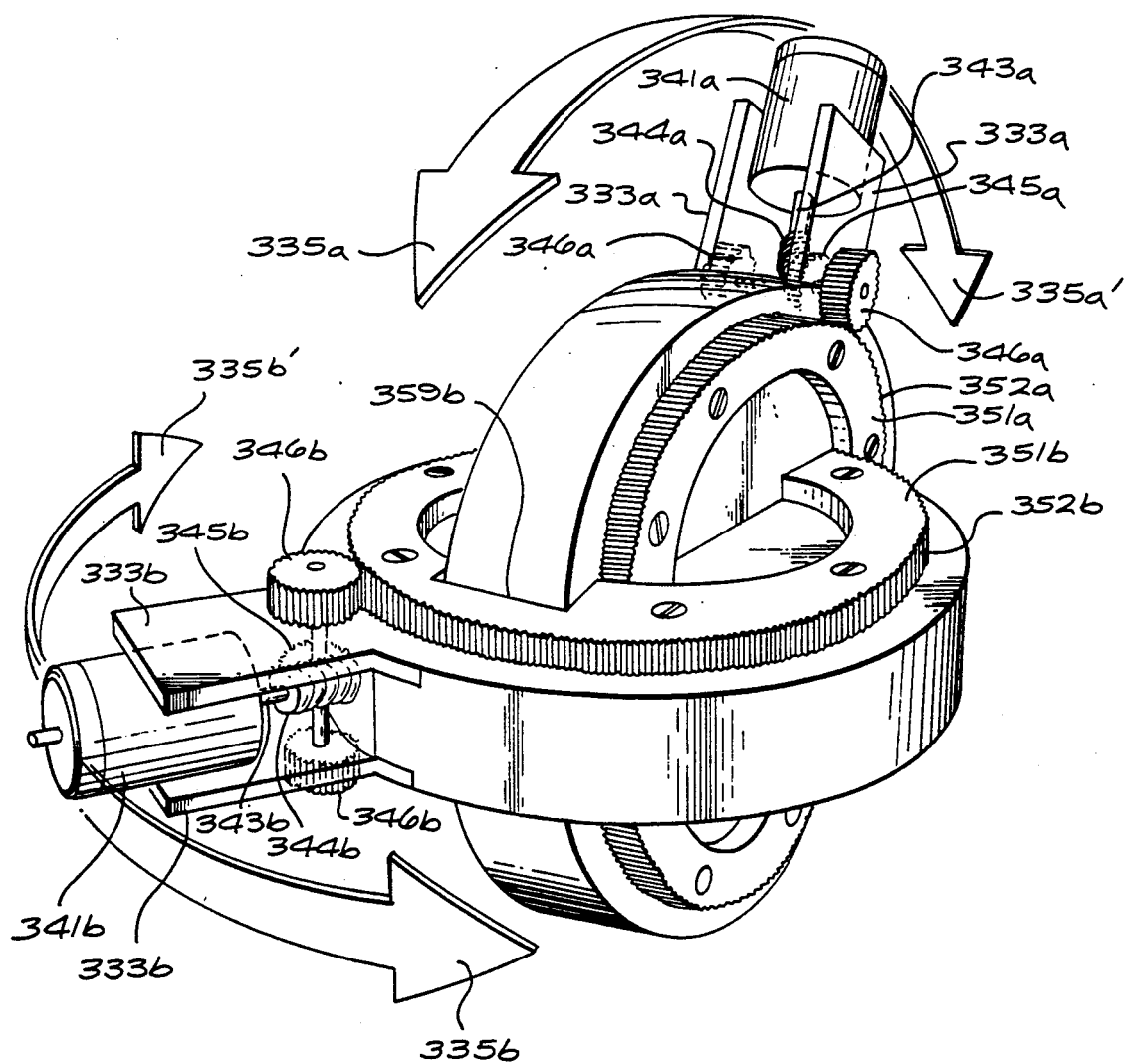
FIG. 26 is an external perspective view of the fourth embodiment, again emphasizing motion of its components from the frame of reference of the inner structure.

FIGS. 29 and 29a show that the crossed-disc guide structure of FIGS. 7 through 12a can be combined with the stem-mounted motor arrangements of FIGS. 20, 23 and 26. (A variation appearing in FIGS. 29, 29a is that only one spur-and-ring-gear train is used for each ring, rather than two as in FIGS. 20 and 23.)

Conversely, FIG. 30 shows that the corner guide system of FIGS. 15 through 19, and FIGS. 21 and 23, can be combined with the side-mounted motor arrangements of FIGS. 12 through 14.

FIGS. 31 through 34 illustrate an extremely inexpensive assembly, related to that of FIG. 18, in which each ring is formed as a shallow "C" channel 922a, 922b (see cross-section in FIG. 32), bent into a horseshoe shape as shown in FIG. 31, and fitted with an insert 933a, 933b that has a near-half-circle inner end 923a', 923b' and a rectangular outer end.

The corner guides have slotted edges 915a, 915a' as shown in FIG. 33; and the inward-protruding flanges 921b, 921b' (FIG. 32) that give the channel its "C" cross-section fit into these slots as shown in FIG. 34, to serve as followers.

The rectangular outer ends of the two ring assemblies 921a-933a, 921b-933b serve as the stems. As will be appreciated, these stems are quite wide along their direction of rotation, and accordingly limit the angular range of rotation more than the stems in earlier-discussed embodiments.

Flux-transmission means can be passed through the straight access holes 937a, 937b: these holes enter the central cavity off-center to help clear the opposing rings in the straight or extended configuration of the joint; and the rings are further apart, center-to-center, than in the previously discussed embodiments—so that the transmission means can bypass the opposing rings without the need for routing around to the point diametrically opposite the stem. In the assembled system, however, the transmission means will be visible where they pass between the inner end of each access hole and the interior cavity of the joint.

If desired the "C" channels and inserts can be extended to serve as long arms, the arms and the rings thus being in effect unitary. This system can be applied in cascade as in FIG. 28—but using between each two adjacent stages a single "C" channel that wraps around corner guides of both stages and has its two cut-off ends abutting each other partway between.

The above-mentioned compromises in angular operating range and in visibility of the transmission means inside the joint are tradeoffs in the interest of an extremely economical assemby that is particularly suited to implementation in lightweight construction for office or consumer applications such as a desk-mounted arm lamp.

Figure 35:
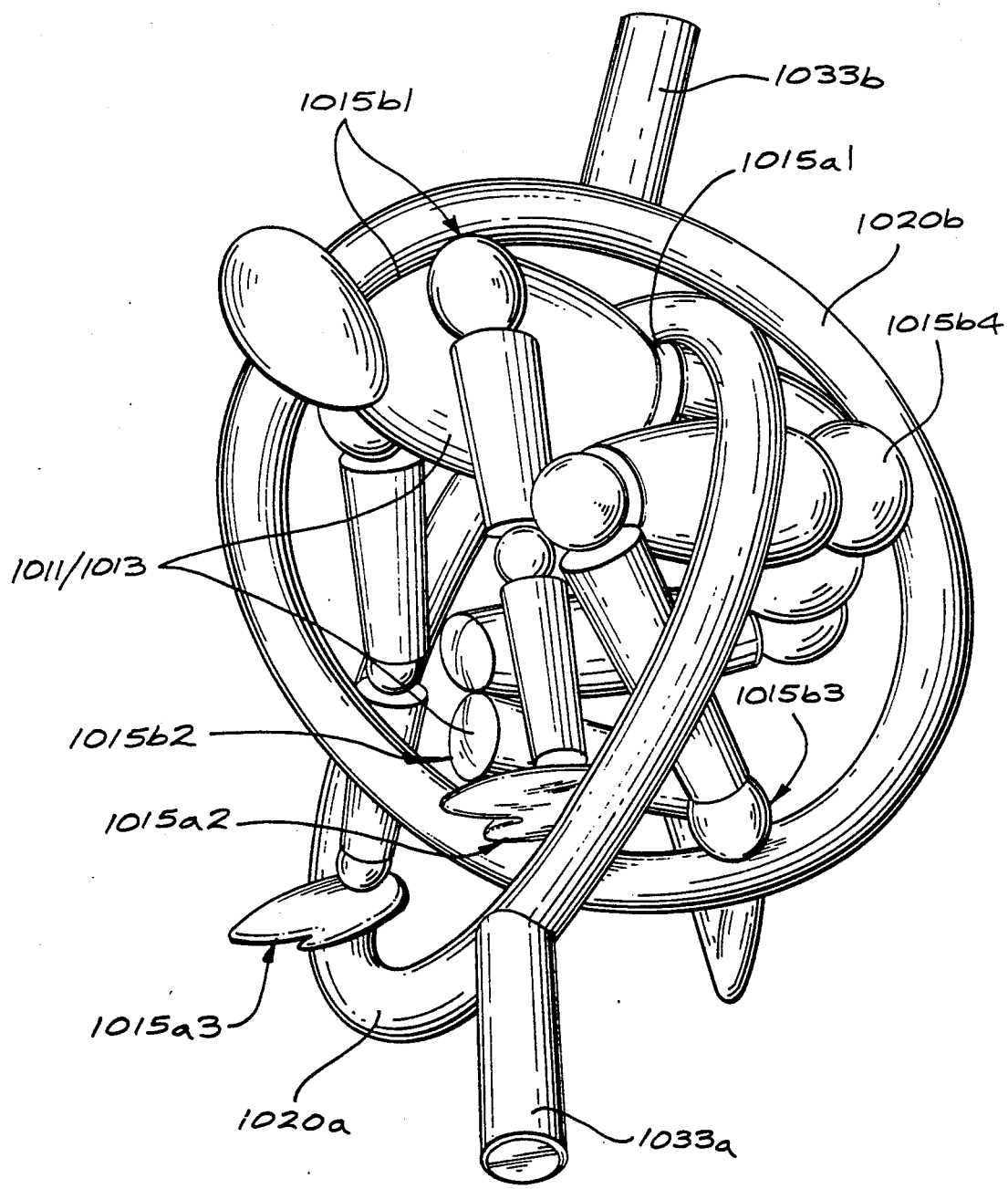
FIG. 35 is a perspective and fanciful view showing yet another type of guide structure, to exemplify the general proposition that the functional portions of the inner guides are the arcuate guiding-edge or guiding-surface segments themselves, and that the interconnecting structure or structures that mutually dispose the guiding edges or surfaces for proper engagement with the outer rings can be arbitrary.

FIG. 35 emphasizes the point made earlier, in reference to FIG. 27 and elsewhere, that the so-called "inner" guide structure can extend well beyond the radii of either or both rings, and can be of entirely arbitrary shape. The guide structure must provide the necessary guide surfaces—either arcuate edges or tracks, or a sufficient number of point contacts—to constrain the rings or other outer bodies to systematic movement.

Here the guide structure 1011/1013 is a rigid figurine. The guide surfaces for the ring 1020a that appears to be angled in the drawing are provided at the figure's waist 1015a1, left palm 1015a2, and right palm 1015a3. Those for the ring 1020b that appears to be vertical are at the figure's neck and shoulders 1015b1, right knee 1015b2, left foot 1015b3 and buttocks 1015b4.

Despite the use of this arbitrarily shaped guide structure, the apparatus of FIG. 35 is a fully functioning joint, with unimpaired angular range of stem rotation. Flux transmission is not readily provided by flexible means passing from the rings into and through the guide structure 1011/1013; but could be provided by means of slip rings, brushes, or sliding fiber or tube connections.

It will be understood that the foregoing disclosure is intended to be merely exemplary, and not to limit the scope of the invention—which is to be determined by reference to the appended claims.

I claim:

1. A connective joint for interconnecting two articles for controlled relative motion, comprising:
   a pair of interlocking bodies;
   means for attaching each of the bodies to one of such articles respectively; and
   structure constraining the bodies for systematic relative movement.

2. The joint of claim 1, further comprising:
   means for applying mechanical force and power to drive said bodies in said systematic relative movement.

3. The joint of claim 1, further comprising:
   means for transmitting a flux between one of such articles and the constraining structure, by way of the attaching means.

4. A connective joint for use in transmitting a flux, and comprising:
   a pair of interlocking bodies, each defining a hole; at least part of each body being small enough to fit through the hole in the other body;
   flexible flux-transmission means connected to at least one of the bodies; and
   structure constraining the bodies for systematic mutual movement, and comprising four guides arranged in pairs; wherein:
   a part of each guide defines a track, part of which is shaped substantially as a portion of a circle; and each guide also defines a cutout slot extending within the circular part of the track; and each slot has a width;
   the two tracks of each pair are mutually substantially parallel and the circular track parts are substantially conaxial;
   the two pairs of guides are interfitted so that the slots in each pair mutually engage the slots in and surfaces of the other pair;
   the interfitted pairs of spaced-apart guides form a substantially hollow enclosure for passage of the flexible flux-transmission means from said at least one of the bodies; and
   each pair of tracks engages one of the two bodies respectively for rotational motion of the bodies relative to the tracks;
   whereby the guides define two mutually fixed pairs of tracks so that in said relative motion the bodies rotate about the hollow enclosure.

5. The joint of claim 4, wherein:
   each body is very generally arched and substantially surrounds its respective hole.

6. The joint of claim 5, wherein:
   each body is a ring.

7. The connective joint of claim 4, wherein:
   the substantially circular part of each track is shaped substantially as more than half of a circle;
   another part of each guide has a substantially noncircular shape; and
   the cutout slot in each guide extends from the substantially noncircular part of that guide into the substantially circular part of the track in that guide.

8. The connective joint of claim 4, wherein:
   the substantially circular part of each track is shaped substantially as more than half of a circle;
   another part of each guide has a substantially noncircular shape; and
   the cutout slot in each guide extends from the substantially noncircular part of that guide into the substantially circular part of the track in that guide, past the center of the circle of the substantially circular part of that track; and within the substantially circular part the cutout slot is disposed generally diametrally.

9. The joint of claim 4, wherein:
   the guides are generally planar discs;
   the slots of each guide pair are mutually substantially equal in width and are mutually aligned; and
   each pair is spaced apart so that the distance between the outer surfaces of the two guides is, at least roughly, equal to the widths of the slots in the other pair.

10. The connective joint of claim 4, wherein:
    each guide has an edge, a section of which is shaped substantially as a portion of a circle; and
    said part of each guide that defines a track is said substantially circular section of the edge of that guide;

the circular parts of the two guide edges of each guide pair are substantially conaxial; and the guide edges form said two mutually fixed pairs of substantially circular tracks.

11. The connective joint of claim 10, wherein:

the substantially circular part of each guide is shaped substantially as an entire circle, except that the cutout slot extends substantially from a substantially circular edge of the guide generally diametrally past the center of the guide.

12. The connective joint of claim 4, further comprising:

flux-utilization means mounted to the body-constraining structure and connected to receive flux from the flexible flux-transmission means;

whereby flux is transmitted by the flux-transmission means from said at least one body to the flux-utilization means, through the hollow enclosure, notwithstanding said rotational motion of the bodies relative to the tracks.

13. The connective joint of claim 12, wherein:

the flux-utilization means comprise motor means driven by the flux to power said rotational motion of the bodies relative to the tracks.

14. The connective joint of claim 4, wherein:

the flexible flux-transmission means are connected to both bodies;

whereby flux is transmitted by the flexible flux-transmission means from one body to the other, through the hollow enclosure, notwithstanding said rotational motion of the bodies relative to the tracks.

15. The connective joint of claim 14, further comprising:

flux-utilization means mounted on said other body and connected to receive flux from the flexible flux-transmission means.

16. The connective joint of claim 15, further comprising:

a base for supporting the bodies;

a first stem extending from said one body for mounting said one body to the base; and a second stem extending from said other body to support the flux-utilization means;

whereby, in said rotation of the bodies relative to the tracks:

said body-constraining structure rotates within said one body and relative to the base, and said other body rotates upon said body-constraining structure;

wherein said rotational motion of the bodies relative to the tracks is angularly limited substantially only by engagement of the second stem with said one body and of the first stem with said other body.

17. The connective joint of claim 16, wherein:

the flux-utilization means comprise motor means mounted on the second stem, and driven by the flux to power said rotational motion of said other body relative to the body-constraining structure.

18. A connective joint for use in transmitting a flux, and comprising:

a pair of interlocking bodies, each defining a hole; at least part of each body being small enough to fit through the hole in the other body; and each body defining a pair of axially spaced-apart circular followers;

flexible flux-transmission means connected to at least one of the bodies; and structure constraining the bodies for systematic mutual movement, and comprising four guides, each in the form of a corner; wherein:

each corner guide comprises a pair of mutually angled tracks, each shaped substantially as a circular segment;

the two circular-segment tracks of each corner guide have mutually offset centers;

the four corner guides are disposed in a generally rectangular or square array, with the circular-segment tracks extending outward from the array; and the pair of circular followers of each body engages four of the circular-segment tracks, respectively, for rotation of that body relative to those four tracks and accordingly relative to the corner-guide array;

the corner guides form a substantially hollow enclosure for passage of the flexible flux-transmission means from said at least one of the bodies;

whereby in said relative motion the bodies rotate about the hollow enclosure.

19. The joint of claim 18, wherein:

the corner guides are held in their array by substantially only the bodies and followers; and the bodies are held in relative position for said systematic mutual movement by substantially only the corner guides and tracks.

20. The joint of claim 18, wherein:

each corner guide comprises a pair of mutually angled plates, each plate defining one of said circular-segment tracks.

21. The connective joint of claim 20, wherein:

each plate has an edge, a section of which is shaped substantially as a segment of a circle; and said part of each plate that defines a track is said substantially circular section of the edge of that plate; and the two circular-segment edges of each corner guide have mutually offset centers.

22. The connective joint of claim 18, further comprising:

flux-utilization means mounted to the body-constraining structure and connected to receive flux from the flexible flux-transmission means;

whereby flux is transmitted by the flux-transmission means from said at least one body to the flux-utilization means, through the hollow enclosure, notwithstanding said rotational motion of the bodies relative to the tracks.

23. The connective joint of claim 22, wherein:

the flux-utilization means comprise motor means driven by the flux to power said rotational motion of the bodies relative to the tracks.

24. The connective joint of claim 23, for use with an article to be moved; and further comprising:

a base for supporting the bodies;

a first stem extending from said one body for mounting said one body to the base; and a second stem extending from the other of said two bodies, to support such an article to be moved;

whereby, in said rotation of the bodies relative to the tracks:

said body-constraining structure rotates within said one body and relative to the base, and said other body rotates upon said body-constraining structure;

wherein said rotational motion of the bodies relative to the tracks is angularly limited substantially only by engagement of the second stem with said one body and of the first stem with said other body.

25. The connective joint of claim 18, wherein:
the flexible flux-transmission means are connected to both bodies;
whereby flux is transmitted by the flexible flux-transmission means from one of said two bodies to the other, through the hollow enclosure, notwithstanding said rotational motion of the bodies relative to the tracks.

26. The connective joint of claim 25, further comprising:
flux-utilization means mounted on said other body and connected to receive flux from the flexible flux-transmission means.

27. The connective joint of claim 26, further comprising:
a base for supporting the bodies;
a first stem extending from said one body for mounting said one body to the base; and
a second stem extending from said other body to support the flux-utilization means;
whereby, in said rotation of the bodies relative to the tracks:
said body-constraining structure rotates within said one body and relative to the base, and
said other body rotates upon said body-constraining structure;
wherein said rotational motion of the bodies relative to the tracks is angularly limited substantially only by engagement of the second stem with said one body and of the first stem with said other body.

28. The connective joint of claim 27, wherein:
the flux-utilization means comprise motor means mounted on the second stem, and driven by the flux to power said rotational motion of said other body relative to the body-constraining structure.

29. The joint of claim 18, wherein:
each body is very generally arched and substantially surrounds its respective hole.

30. The joint of claim 29, wherein:
each body is a ring.

31. A connective joint providing a rotational component of relative motion of two articles, and for use in transmitting a flux; and comprising:
a pair of guide-and-follower sets, each set including:
an arcuate guide member, and
a corresponding follower member, adapted and disposed to ride along the corresponding guide to define an arcuate motion of the follower relative to the guide;
one particular member of one set being fixed to or integral with one particular member of the other set, whereby the remaining two members are constrained to mutually arcuate compound trajectories;
two interlocked outer structures, each having a very generally arched body surrounding a very generally central aperture, and each fixed to or integral with one of said remaining two members; whereby the interlocked outer structures are likewise constrained to mutually arcuate compound trajectories;
connection means on each outer structure for securing that structure to one of such two articles respectively; and
flexible flux-transmitting means for transmitting such flux from the connection means on one outer structure;
said pair of guide-and-follower sets defining a hollow internal structure for passage of the flexible flux-transmitting means from the connection means on said one outer structure and within the joint, notwithstanding motion of said remaining two members in said mutually arcuate compound trajectories.

32. The joint of claim 31, particularly for use in transmitting such flux between the articles; and wherein:
the flux-transmitting means are connected to transmit such flux from the connection means on one structure to the connection means on the other structure.

33. The joint of claim 32, further comprising:
flux-utilization means carried by the joint;
wherein the transmitting means transmit such flux from the connection means on one structure to the flux-utilization means.

34. The joint of claim 33, wherein:
the flux-utilization means are carried by the guide-and-follower sets.

35. The joint of claim 33, wherein:
the flux-utilization means are carried by at least one of the outer structures.

36. A connective joint comprising:
a pair of interlocking bodies, each defining a hole; at least part of each body being small enough to fit through the hole in the other body;
traction means defined along at least one of the bodies;
structure constraining the bodies for systematic mutual movement; and
mounted to the body-constraining structure, a discrete force-applying device for engaging the traction means to drive said at least one of the bodies relative to the body-constraining structure.

37. The joint of claim 36, wherein:
each body has a central axis; and
the body-constraining structure comprises a pair of interconnected tracks:
a first one of the tracks being supported by a first body, for rotation of the first track about the central axis of the first body, and
a second one of the tracks supporting a second body, for rotation of the second body about its own central axis;
whereby said systematic mutual movement comprises rotation of each body about its own central axis, relative to the interconnected tracks.

38. The joint of claim 36, further comprising:
means, associated with the body-constraining structure, for transmitting a flux from one of the bodies.

39. The joint of claim 38, wherein:
the transmitting means transmit a flux from one of the bodies to the other body.

40. The joint of claim 38, wherein:
the force-applying device comprises a discrete motor; and
the transmitting means transmit a flux of a power-conveying medium from said one of the bodies to power the motor.

41. The joint of claim 40, wherein:
the flux-transmitting means comprise a flexible transmission line, fixed to said one of the bodies, for carrying the flux of power-conveying medium.

42. The joint of claim 41, wherein:

the body-constraining structure comprises a hollow portion for passage of the transmission line;

whereby the flexible transmission line transmits power to the motor through the hollow portion of the body-constraining structure, notwithstanding said systematic mutual movement.

43. The joint of claim 36, wherein:

the body-constraining structure comprises two pairs of notched substantially circular discs;

each disc defines a cutout slot;

the two discs of each pair are spaced apart, substantially planar, and mutually parallel and coaxial, and the slots are mutually aligned; and the two pairs of discs are interfitted by insertion of each pair into the slots of the other pair.

44. A connective joint comprising:

a pair of interlocking bodies, each defining a hole; at least part of each body being small enough to fit through the hole in the other body;

structure constraining the bodies for systematic mutual movement;

traction means defined along the body-constraining structure; and mounted to at least one of the bodies, a discrete force-applying device for engaging the traction means to drive said at least one of the bodies relative to the body-constraining structure.

45. The joint of claim 44, further comprising:

a stem connected to said at least one of the bodies, for attachment of the body to an article;

wherein the motor is mounted to the stem.

46. The joint of claim 44, wherein:

each body has a central axis; and the body-constraining structure comprises a pair of interconnected tracks:

a first one of the tracks being supported by a first body, for rotation of the first track about the central axis of the first body, and a second one of the tracks supporting a second body, for rotation of the second body about its own central axis;

whereby said systematic mutual movement comprises rotation of each body about its own central axis, relative to the interconnected tracks.

47. The joint of claim 44, further comprising:

means, associated with the body-constraining structure, for transmitting a flux from one of the bodies.

48. The joint of claim 47, wherein:

the transmitting means transmit a flux from one of the bodies to the other body.

49. The joint of claim 47, wherein:

the force-applying device comprises a discrete motor; and the transmitting means transmit a flux of a power-conveying medium from said one of the bodies to power the motor.

50. The joint of claim 49, wherein:

the flux-transmitting means comprise a flexible transmission line, for the power-conveying medium flux, fixed to said one of the bodies.

51. The joint of claim 50, wherein:

the body-constraining structure comprises a hollow portion for passage of the transmission line;

whereby the flexible transmission line transmits power to the motor through the hollow portion of the body-constraining structure, notwithstanding said systematic mutual movement.

52. The joint of claim 44, wherein:

the body-constraining structure comprises two pairs of notched substantially circular discs;

each disc defines a cutout slot;

the two discs of each pair are spaced apart, substantially planar, and mutually parallel and coaxial, and the slots are mutually aligned; and the two pairs of discs are interfitted by insertion of each pair into the slots of the other pair.

53. A connective joint comprising:

a pair of body-and-constraint sets, each set including:

a body member defining a hole, at least part of the body member being small enough to fit through the hole in the body member of the other set, and a constraint-structure member for constraining the body member of the same set for systematic movement;

wherein the body members of the two sets are interlocking; and the constraint-structure members of the two sets are interconnected so that in conjunction they constrain the two body members for systematic mutual movement;

traction means defined along one member of at least one set; and mounted to the other member of said at least one set, a discrete motor for engaging the traction means to drive the two members of said at least one set relative to each other.

54. A connective joint comprising:

a pair of body-and-constraint sets, each set including:

a body member defining a hole, at least part of the body member being small enough to fit through the hole in the body member of the other set, and a constraint-structure member for constraining the body member of the same set for systematic movement;

wherein the body members of the two sets are interlocking; and the constraint-structure members of the two sets are interconnected so that in conjunction they constrain the two body members for systematic mutual movement;

traction means defined along one particular member of each set; and mounted to the other member of each set, a discrete motor for engaging the traction means on said particular member of that same set, to drive the two members of that set relative to each other.

* * * * *